(12) United States Patent
Ishii et al.

(10) Patent No.: US 7,748,214 B2
(45) Date of Patent: Jul. 6, 2010

(54) EXHAUST GAS PURIFICATION SYSTEM FOR HYBRID VEHICLE

(75) Inventors: Hiroshi Ishii, Yokohama (JP); Yasuhisa Kitahara, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 384 days.

(21) Appl. No.: 11/712,683

(22) Filed: Mar. 1, 2007

(65) Prior Publication Data

US 2007/0204601 A1    Sep. 6, 2007

(30) Foreign Application Priority Data

Mar. 3, 2006  (JP)  ............................. 2006-057523
Mar. 6, 2006  (JP)  ............................. 2006-059751

(51) Int. Cl.
*F01N 3/00*  (2006.01)
(52) U.S. Cl. ............................. 60/295; 60/284; 60/285; 60/300; 180/65.2; 180/65.3; 180/65.4
(58) Field of Classification Search .................. 60/295, 60/297, 298, 311, 285, 300, 284, 286; 180/65.265, 180/65.275, 65.28, 65.285
See application file for complete search history.

(56) References Cited

U.S. PATENT DOCUMENTS 6,327,852 B1 *  12/2001  Hirose ......................... 60/297

2002/0038654 A1 *  4/2002  Sasaki et al. ........... 123/568.11
2003/0145582 A1 *  8/2003  Bunting et al. ................. 60/297

FOREIGN PATENT DOCUMENTS

| JP | 2002-097939 | 4/2002 |
|---|---|---|
| JP | 2004-278465 | 10/2004 |
| JP | 2006-037788 A | 2/2006 |

OTHER PUBLICATIONS

Office Action in Japanese Patent Application No. 2006-059751, dated Nov. 4, 2009 and English translation thereof (6 pages).
English Patent Abstract of JP2006037788 from esp@cenet, published Feb. 9, 2006 (1 page).

* cited by examiner

*Primary Examiner*—Binh Q Tran
(74) *Attorney, Agent, or Firm*—Osha • Liang LLP

(57) ABSTRACT

An exhaust gas purification system for a hybrid vehicle is disclosed. An internal combustion engine and an electric motor are each arranged for providing power output for the vehicle. An exhaust gas purification device is provided in an exhaust gas passage of the engine to treat exhaust gas components contained in the exhaust gas from the engine. A controller is arranged and configured to selectively perform a regeneration operation of the exhaust gas purification device to burn and remove deposits accumulated in the exhaust gas purification device. The controller is further arranged and configured to control the internal combustion engine and the electric motor such that the exhaust gas purification device is restrained from reaching an excessive temperature during the regeneration operation of the exhaust gas purification device.

23 Claims, 15 Drawing Sheets

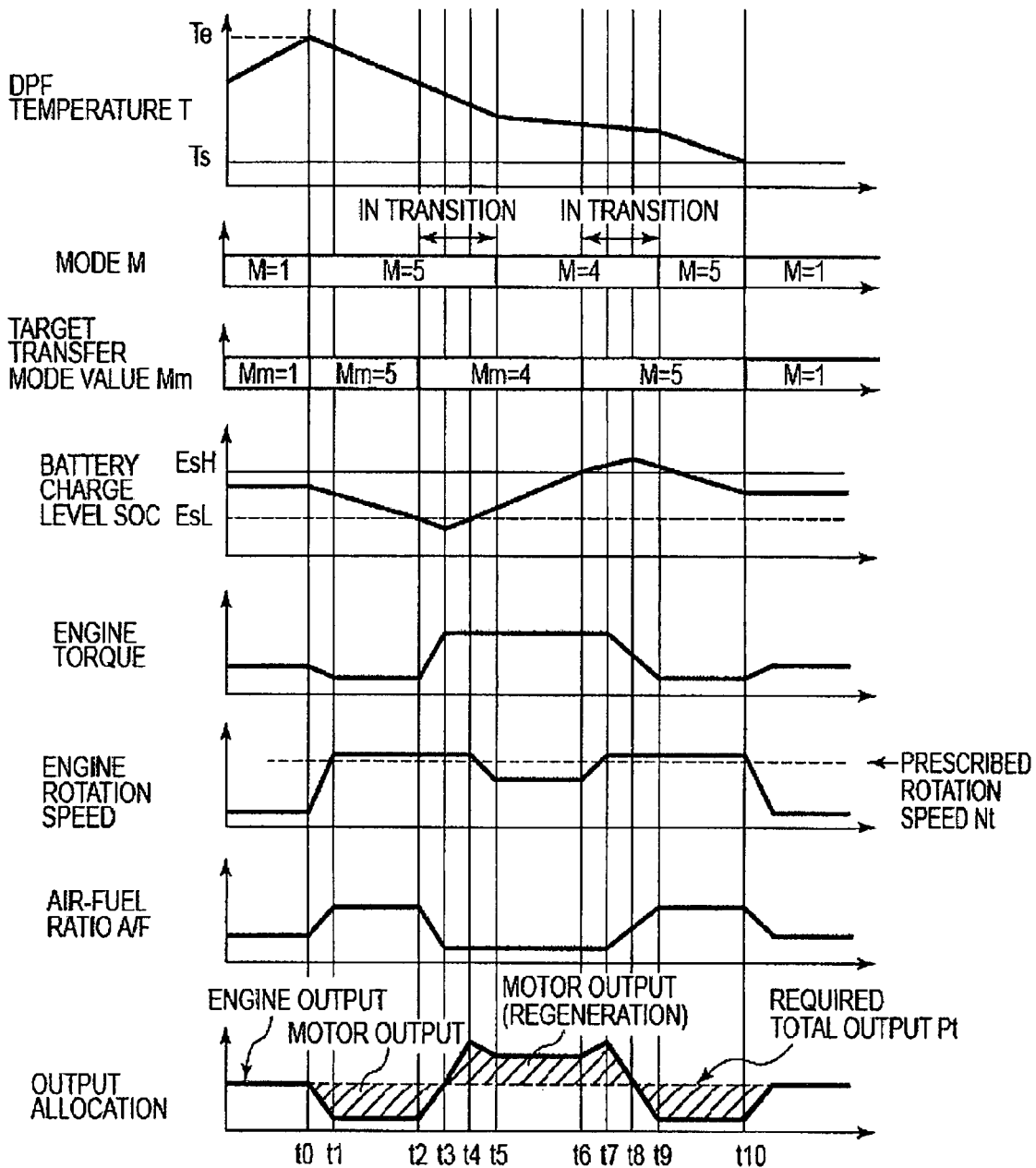

EXHAUST GAS PURIFICATION SYSTEM FOR HYBRID VEHICLE

CROSS-REFERENCES TO RELATED APPLICATION

This application claims priority from Japanese Patent Application No. 2006-057523 filed on Mar. 3, 2006 and Japanese Patent Application No. 2006-059751 filed on Mar. 6, 2006, the entire contents of which are incorporated herein by reference.

TECHNICAL FIELD

The present invention pertains to a hybrid vehicle equipped with an internal combustion engine and an electric motor, which functions also as a generator, as driving sources of the vehicle. In particular, it pertains to a technology for regenerating an exhaust gas purification device for said internal combustion engine.

BACKGROUND

In one type of a vehicle, as described in Japanese Kokai Patent Application No. 2002-097939, the vehicle includes an internal combustion engine and a NOx absorber catalyst type of an exhaust gas purification device that collects deposits from the exhaust gas. The deposits include sulfur deposits. When the deposition count of deposits in the exhaust gas purification device exceeds a prescribed value, regeneration or regenerative removal of the deposits is deemed to be required. For regeneration, the temperature of the exhaust gas purification device (NOx adsorption catalyst) is increased to remove the sulfur deposits by burning them off.

This will effectively regenerate (sometimes called "depoison") the NOx absorber catalyst type exhaust gas purification device.

To avoid deteriorating the NOx absorber catalyst type exhaust gas purification device, it is good to avoid excessive temperature, above the temperature required for burning the sulfur deposits, during regeneration and when the regeneration of the exhaust gas purification device is completed, it is good to reduce the temperature promptly. One way to reduce the temperature of the exhaust gases from the engine is to decrease the air-fuel ratio (to make a correction to bring it to the rich side, that is excess fuel) while the engine is rotating slowly and under a low load. However, attaining a stable temperature may be delayed because the reduction of the temperature is slow when the air-fuel ratio is decreased.

SUMMARY

One or more embodiments of the present invention pertain to an exhaust gas purification system for a hybrid vehicle. The exhaust gas purification system includes an internal combustion engine and an electric motor each arranged for providing power output for the vehicle. An exhaust gas purification device is provided in an exhaust gas passage of the engine to treat exhaust gas components contained in the exhaust gas from the engine. A controller is arranged and configured to selectively perform a regeneration operation of the exhaust gas purification device to burn and remove deposits accumulated in the exhaust gas purification device. The controller is further arranged and configured to control the internal combustion engine and the electric motor such that the exhaust gas purification device is restrained from reaching an excessive temperature during the regeneration operation of the exhaust gas purification device.

BRIEF DESCRIPTION OF DRAWINGS

FIG. 23 is a comparison time plot showing a plurality of control process parameters as a function of time for a control process as shown in the flowchart of FIG. 22 for an alternative embodiment.

DETAILED DESCRIPTION

Alternative embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
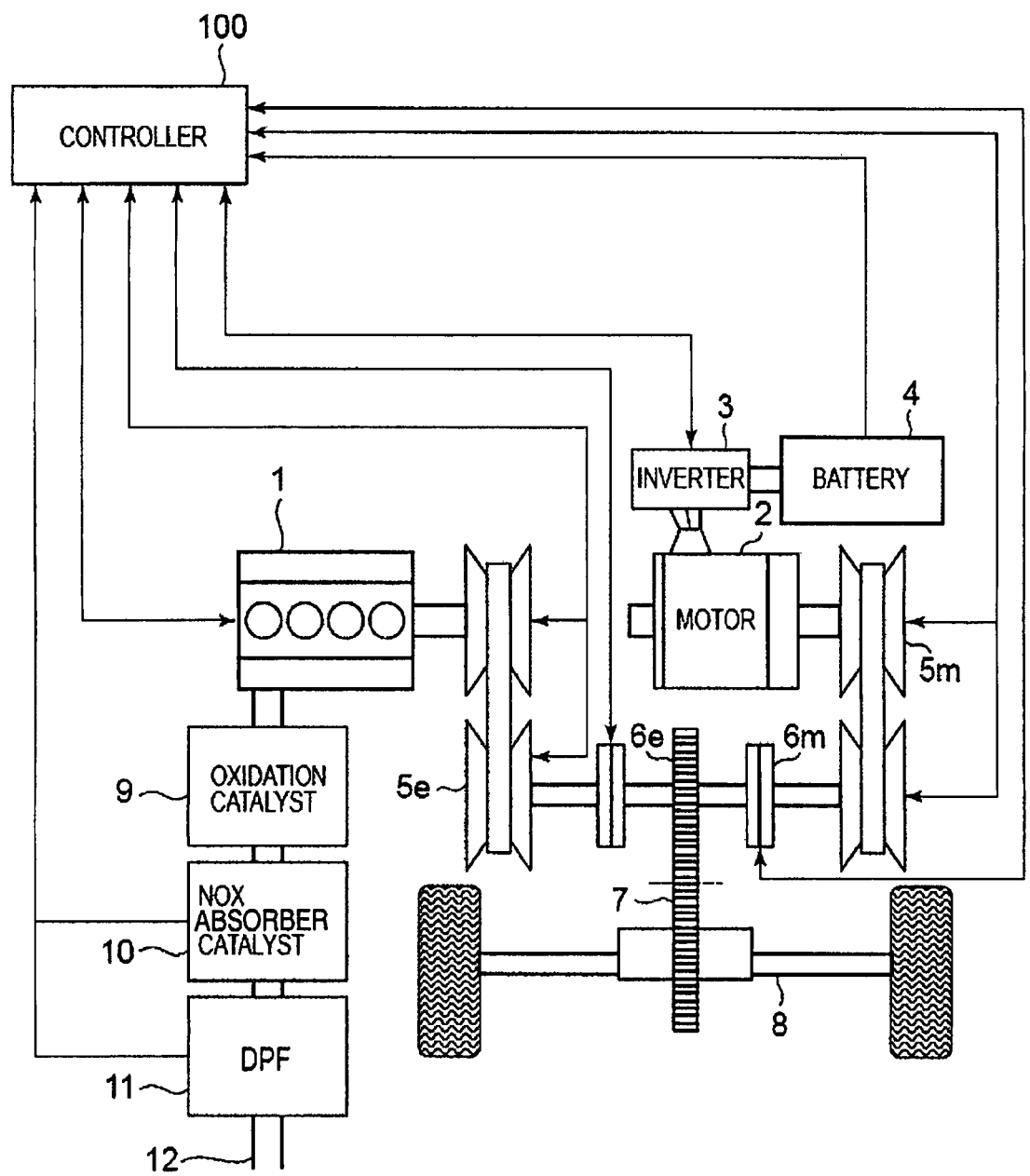
FIG. 1 is a system diagram of a hybrid vehicle according to one embodiment of the present invention.

FIG. 1 is a system diagram of a hybrid vehicle for which one or more embodiments of the present invention may be useful.

The hybrid vehicle is equipped with an internal combustion engine (sometimes referred to as "engine" hereinafter) 1 and an electric motor (sometime referred to also as a motor or as a motor-generator) 2, which functions also as a generator. Motor 2 is electrically connected to a battery 4 via an inverter 3.

Output shafts of engine 1 and motor 2 are linked to the input shaft of a final reduction gear device 7 via one or more transmissions (as for example a belt-based continuously variable transmission; CVT) 5e, 5m and clutches 6e and 6m. Drive wheels are attached to an output shaft (axle) 8 of final reduction gear device 7.

Engine 1 in this example may be a diesel engine 1, and the amount of torque generated may be controlled by controlling the amount of fuel injected into the engine 1. In addition, the exhaust temperature can be increased by retardation of fuel injection timing (including post-injection during the expansion stroke or the exhaust stroke).

Motor 2 in this example may be a motor-generator 2 and the amount of torque generated may be controlled by controlling the amount of electricity from battery 4 that is consumed by the motor 2.

Engine 1 and motor 2 are capable of driving the vehicle individually via respective clutches 6e and 6m or in collaboration.

When the speed of the vehicle is reduced, engine braking by engine 1 can be used; generation of electric power by rotating motor-generator 2 can also be used for braking, and the electric power generated by the rotation of the motor—generator 2 for braking can be charged into battery 4 via inverter 3. In addition, motor 2 may be driven via clutch 6m and transmission 5m while the vehicle is driven using engine 1, that is, the vehicle and motor 2 are driven by engine 1, the electric power generated by motor 2 can be charged into battery 4 via inverter 3.

An oxidation catalyst 9, a NOx absorber catalyst 10, and a diesel particulate filter (sometimes referred to as "DPF" hereinafter) 11 are provided as an exhaust gas purification device on and along an exhaust gas path 12 of diesel engine 1.

Oxidation catalyst 9 applies oxidation treatment to hydrocarbon (HC) and to carbon monoxide (CO) in the exhaust gas.

NOx absorber catalyst 10 is for adsorbing NOx in the exhaust gas, and it is capable of removing NOx for purification in a rich atmosphere.

DPF 11 is for capturing PM (particulate matter) in the exhaust gas, and it holds a catalyst for facilitating the burning of PM during a process of regeneration of the filtering capabilities of the DPF 11.

In use, the DPF 11 becomes clogged due to the accumulation of captured PM, and the drivability of the engine and hence of the vehicle deteriorates due to an increase in the exhaust resistance. A PM deposition count is estimated and when the deposition count becomes equal to or greater than a prescribed value, a decision is made that it is time for regeneration. The DPF 11 is regenerated by applying a regenerative treatment so as to increase the temperature of the DPF 11 in order to burn and remove the PM deposited on the DPF 11.

In addition, as sulfur (S) poisoning occurs in the NOx absorber catalyst 10 due to the use over a long time so as to deteriorate the NOx adsorption efficiency. A sulfur deposition count (sulfur poisoning count) is estimated and when said count has become equal to or higher than a prescribed value, a decision is made that it is time for regeneration of the NOx absorber catalyst 10. A regenerative treatment (depoisoning treatment) of the NOx absorber catalyst 10 involves increasing the temperature of the NOx absorber catalyst so as to remove the sulfur deposited on the NOx absorber catalyst by burning it in order to regenerate (depoison) the NOx adsorption catalyst.

To start to regenerate the exhaust gas purification device (including both the DPF 11 and the NOx absorber catalyst 10); the timing for injecting the fuel into engine 1 may be retarded. Also or in the alternative, the output of engine 1 may be increased beyond the required output for driving the vehicle so that the surplus power output is used to drive motor 2 so as to generate electric power.

The exhaust gas temperature from the engine is increased because of the high load power generation operation and this brings the temperature of the exhaust gas purification device higher. For regeneration the exhaust gas temperature is raised higher than the combustion temperature of PM and sulfur deposits in the DPF and the NOx catalyst, respectively.

Controller 100 is operatively connected to engine 1 and motor 2; to thereby carry out the engine control, motor control, regenerative control, and/or control over the collaboration of power production or power use between the engine and the motor. The allocation of engine output power (sometimes referred to herein as "engine output") and motor output power (sometimes referred to herein as "motor output") with respect to the total required output power for driving the vehicle (sometimes referred to herein as "total output").

In the present embodiment, when the regeneration of the exhaust gas purification device (DPF 11 and NOx absorber catalyst 10) is completed, the controller 100 controls the system in such a manner that the output of motor 2 is increased. In one embodiment controller 100 stops the supply of fuel to the engine, and there is a switch to motor-based driving where only the motor 2 is used to obtain the required output power. The engine 1 may also be revolved at a prescribed rotation speed or faster using the motor 2 so as to reduce the load of engine 1; and to increase the cooling gas (air passed through the rotating engine 1) that is supplied to the exhaust gas purification device in order to reduce the temperature of the exhaust gas purification device promptly after regeneration is completed. In one example, the prescribed rotation speed refers to a lower limit value (see for example Nt in FIG. 12) of the rotation speed that allows the temperature of the exhaust gas purification device to be reduced. As a result, an excessive temperature can be usefully restrained by reducing the temperature of the exhaust gas purification device promptly as soon as the regeneration of the exhaust gas purification device is completed.

In addition, to enable motor-based driving when the regeneration is completed, a desired charge level or state of charge (SOC) of battery 4 must be obtained during regeneration while the loaded on the engine 1 is used for power generation in motor 2 so that the exhaust gas temperature is raised. Thus, prior to the completion of the regeneration (while the regeneration is in progress), the controller controls the output of engine 1 by increasing the engine output to let engine 1 drive motor 2 so as to generate electric power in order increase charge level SOC of battery 4 at the same time to increase the regeneration temperature of the engine exhaust gas and hence the purification device.

The control will be explained in detail below using an example of regeneration of DPF 11.

Figure 2:
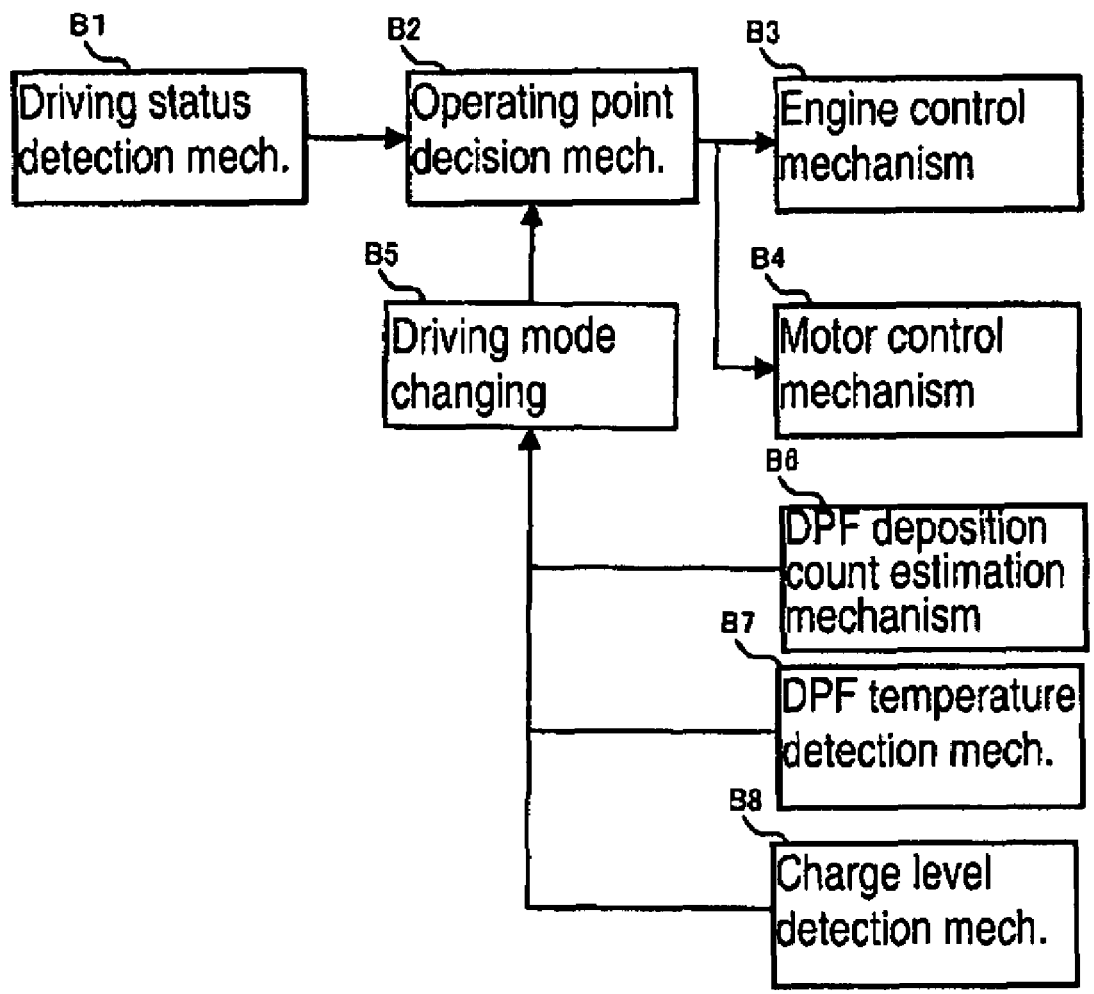
FIG. 2 is a block diagram for controlling the hybrid vehicle of FIG. 1.

FIG. 2 is a block diagram for a process of controlling the hybrid vehicle.

A driving status detection mechanism B1 detects a given driving status of the vehicle. An operating point decision mechanism B2 decides each operating point of the engine and the motor according to the detection point detected by status detection mechanism B1. An engine control mechanism B3 controls the engine 1 according to the engine operating point decided by operating point decision mechanism B2, and a motor control mechanism B4 controls the motor 2 according to the motor operating point decided by operating point decision mechanism B2.

Due to the relationship of the operating point decision mechanism B2 with the control of the DPF regeneration, the controller 100 is configured so as to change the operating points according to several factors including one or more of a driving mode specified by a driving mode changing mechanism B5; information items from a DPF deposition count estimation mechanism B6, information items from a DPF temperature detection mechanism B7, and information from a charge level detection mechanism B8. In one embodiment, all of these factors are input to the driving mode changing mechanism B5.

According to one example the DPF deposition count estimation mechanism B6 utilizes a pressure difference sensor, which detects the pressure difference between the exhaust gas pressure on the upstream side and the exhaust gas pressure on the downstream side of the DPF. In one example, the DPF deposition count estimation mechanism estimates the PM deposition count C based on the pressure difference together with the engine operation status (such as may be determined by an exhaust gas flow rate, or an engine rotation speed (rpm) and the load of the engine which define the engine operation status). Alternatively, in another example, a PM deposition count C may be estimated by estimating the amount of PM to be captured per unit time and integrating the estimated amount of PM over the time of engine operation.

In order to detect DPF temperature, A DPF temperature detection mechanism B7 may, for example, use a sensor that detects the temperature of the DPF holder or that detects the exhaust gas temperature(s) on the downstream side, and/or the exhaust gas temperature(s) on the upstream side of the DPF.

A charge level detection mechanism B8 may, for example, detect a charge level SOC of the battery using a current sensor that detects the current discharged from the battery and integrate the current discharge over time of operation. In this example, the charge level SOC is usually obtained in the form of a ratio (%) with respect to a fully charged level for the battery.

Next, driving modes to be specified by driving mode changing mechanism B5 according to DPF statuses will be explained.

Several potentially available operating modes will be explained including a normal mode (M=1), a motor-based driving mode (M=2), and a charge level increasing mode (M=3) are available as driving modes.

A normal mode (M=1) is a mode for the normal driving including during DPF regeneration; wherein, a total output power Pt required by the vehicle is computed based on driving status information from the driving status detection means. The engine output power Pe and the motor output power Pm are decided according to an allocation table graphically represented in FIG. 3, of the required total output Pt based on the hybrid output power (sometimes referred to as "engine/motor output" herein), which shows the allocation of hybrid outputs for the engine and the motor with respect to the total output. The controller 100 controls the output allocation to obtain the total output, as by providing operating instructions to an engine control mechanism and a motor control means.

Figure 4:
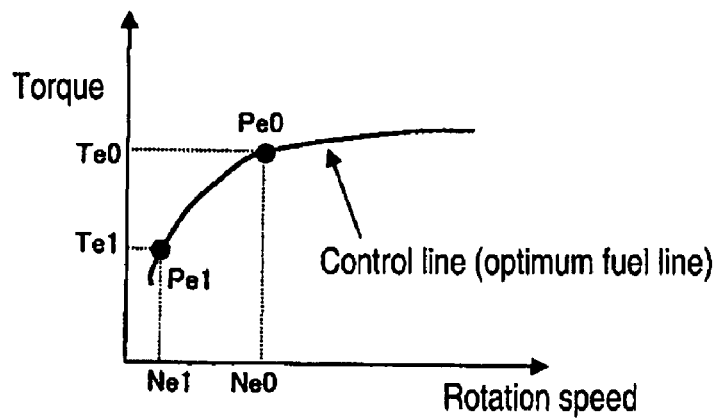
FIG. 4 is a graph of torque versus rotation speed as may be derived from an internal combustion engine operating point table for optimum fuel consumption.

In the engine control means, an operating point may be decided based on engine output Pe determined according to an engine operating point table, as may be graphically represented in FIG. 4. Such an operating point table may provide or set combinations of torques Te$_0$, Te$_1$, . . . , and etc. and rotation speeds Ne$_0$, Ne$_1$, . . . , and etc. at which the fuel consumption becomes optimum with respect to the respective engine output values Pe$_0$, Pe$_1$, . . . , and etc.

Figure 5:
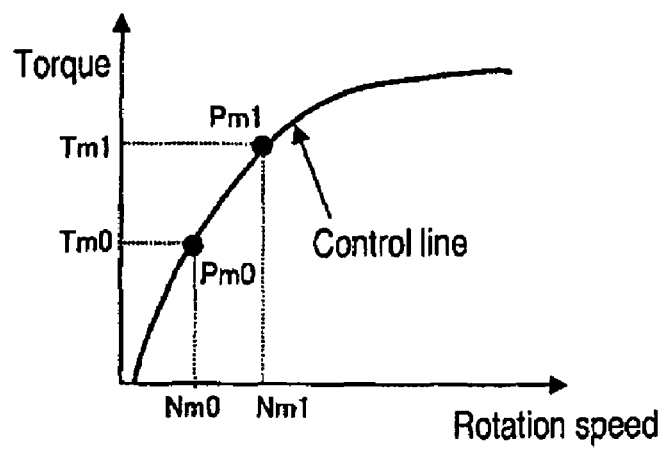
FIG. 5 is a graph of torque versus rotation speed as may be derived from an electric motor operating point table.

In the motor control means, an operating point may be decided based on motor output Pm determined according to the motor operating point table, as may be graphically represented in FIG. 5. Such an operating point table may provide or set combinations of torques Tm$_0$, Tm$_1$, . . . , and etc. and rotation speeds Nm$_0$, Nm$_1$, . . . , and etc. at which the fuel consumption becomes optimum with respect to the respective motor output values Pm$_0$, Pm$_1$, . . . , and etc.

A motor-based driving mode (M=2) is a driving mode used when the DPF regeneration is completed (immediately after the completion); therein, the motor output (ratio) is increased so as to obtain a total output using only the motor, at least in a low total output area (motor output 100% and engine output 0%). The clutch is kept engaged so as to rotate the engine at a prescribed rotation speed or faster (loadless high revolution) using the motor only while the supply of fuel to the engine 1 is stopped. The rotating engine thereby supplies cooling air to the DPF. In this situation, an engine rotation speed at which sufficient air for reducing the temperature of the DPF can be supplied is set as the prescribed rotation speed.

Figure 6:
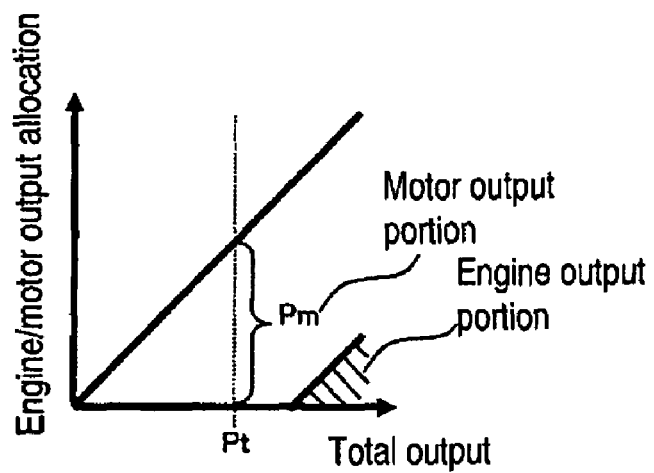
FIG. 6 is a graph engine/motor output allocation versus total output that may be derived from an output allocation table as may be used under a motor-based driving mode (M=2).

For this purpose, engine output Pe and motor output Pm are decided from total required output Pt using a hybrid output allocation table, as may be graphically depicted as in FIG. 6, and the controller 100 provides instructions to the engine control mechanism and to the motor control means.

In the hybrid output allocation table, as graphically depicted in FIG. 6, the engine output is set at 0, and the motor output ratio is set at 100% in the low-medium total output range (or area) of operation of the vehicle. This does not normally extend to the high total output range (or area) of operation.

Because autonomous revolution of the engine is lost, and the apparent engine output goes negative when the supply of fuel is stopped in the low-medium output area, the motor output may be increased by an amount in order to obtain the required total output Pt. In reality, the output allocation table represented in FIG. 6 can be realized by making an approximate correction so as to increase the motor output appropriately when the supply of fuel is stopped.

Figure 7:
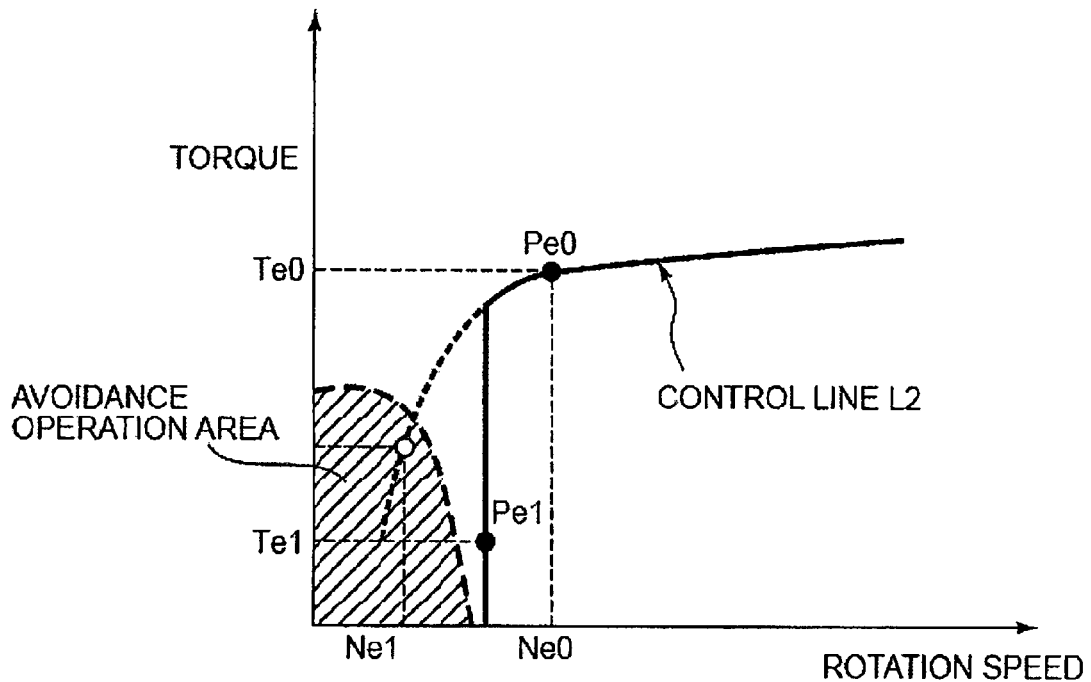
FIG. 7 is a graph of torque versus rotation speed as may be derived from an internal combustion engine operating point table as may be used under a motor-based driving mode (M=2).

Furthermore, although the engine operating point table to be used under the motor-based driving mode (M=2) may be the same as that depicted graphically in FIG. 4, motor driving power and hence vehicle driving may be lost while the motor is operating in the low revolution area as shown in FIG. 7.

A charge level increasing mode (M=3) is a driving mode prior to the DPF regeneration, wherein the engine output (ratio) is increased in order to increase the amount of electric power generated. The reason is to assure battery charge level SOC before the motor-based driving begins when the DPF regeneration is completed.

Figure 8:
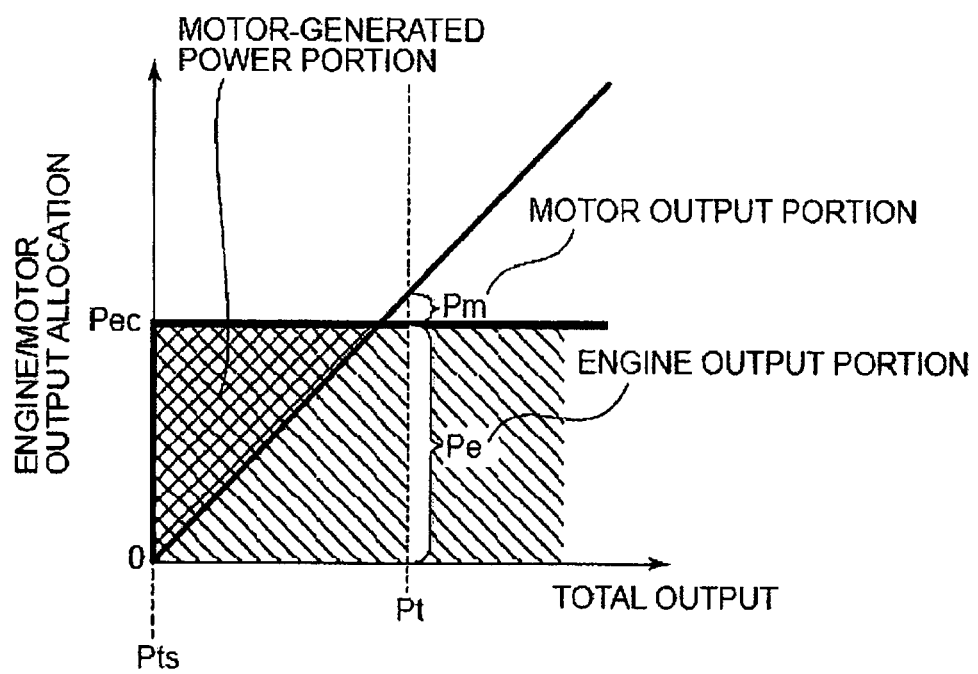
FIG. 8 is a graph engine/motor output allocation versus total output that may be derived from an output allocation table as may be used under a charge level increasing mode (M=3).

For this purpose, engine output Pe and motor output Pm are decided from required total output Pt using a hybrid output allocation table graphically depicted in FIG. 8 and the controller 100 provides instructions to the engine control mechanism and the motor control mechanism accordingly.

Figure 3:
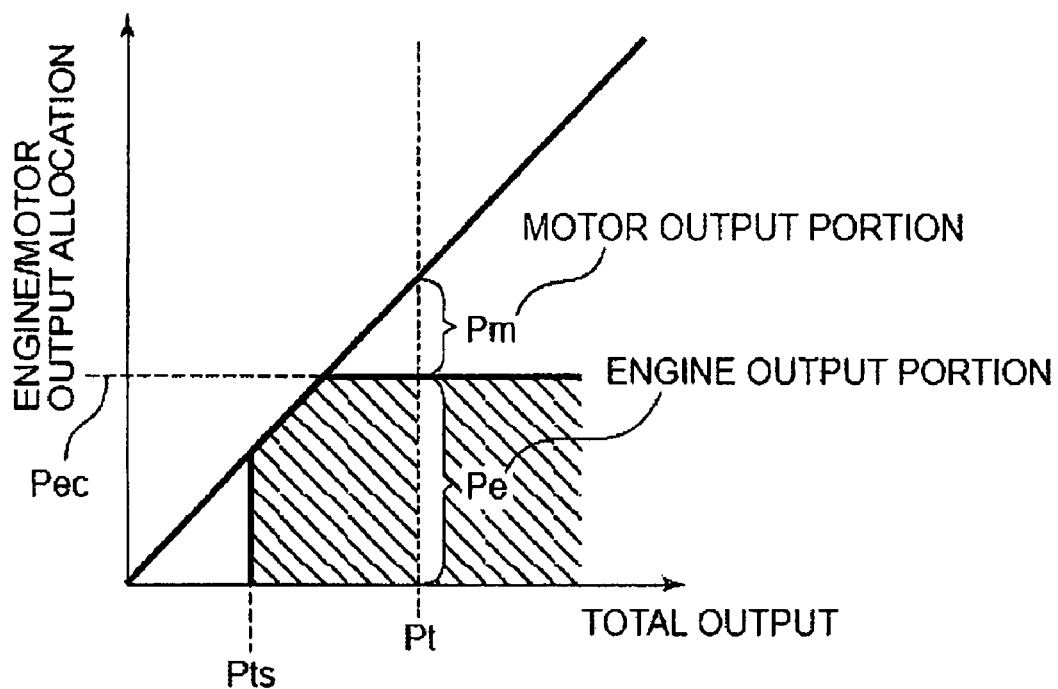
FIG. 3 is a graph engine/motor output allocation versus total output that may be derived from an output allocation table as may be used under a normal vehicle operation mode (M=1).

Contrary to the hybrid output allocation table in FIG. 3, in the hybrid output allocation table in FIG. 8, a required total output lower limit value Pts for starting up the engine output is reduced (=0) while increasing upper limit value Pec of the engine output in order to increase the ratio of engine output Pe to required total output Pt or motor output Pm.

More specifically, engine output Pe is set at a relatively high prescribed value Pec over the entire area of the hybrid output allocation table represented in FIG. 8 in order to utilize the surplus portion (Pec−Pt) of the engine output above required total output Pt as motor-generated electric power portion in the low-medium output area.

Figure 9:
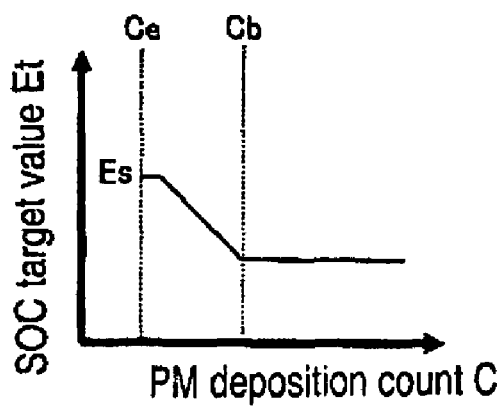
FIG. 9 is a graph of battery state of charge (SOC) target value (Et) versus PM deposition count (C).

In addition, under the charge level increasing mode (M=3), a target value Et for charge level SOC is set according to PM deposition count C with reference to the table graphically depicted in FIG. 9. In this mode, when the PM deposition count C is equal to or lower than prescribed value Cb used for decision prior to the completion of the regeneration, target value Et for charge level SOC is increased as PM deposition count C decreases. In addition, Et=Es (fixed value) is set when the PM deposition count C approaches a prescribed value Ce used for decision prior to the completion of the regeneration.

As the target value Et for charge level SOC increases, the ratio of the engine output to the required total output is increased while decreasing the ratio of the motor output in order to increase the electric power generated.

Figure 10:
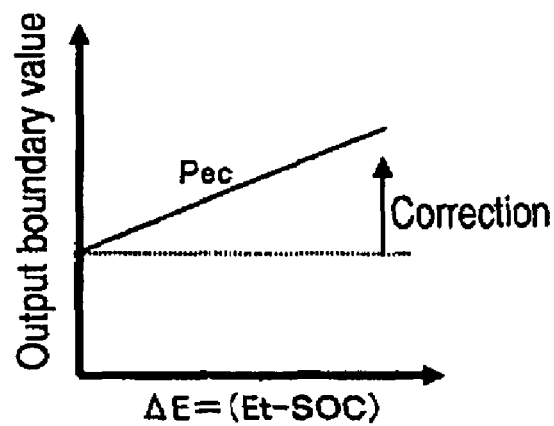
FIG. 10 is a graph showing a relationship between the output power boundaries limits values and the degree of divergence from the SOC target value.

More specifically, as shown in FIG. 10, a correction may be made in the hybrid output allocation table represented in FIG. 8 in such a manner that an upper limit value Pec of the engine output is increased as the degree of divergence ΔE (=Et−SOC) between target value Et for the charge level and actual value SOC becomes greater. In this example, the correction is made when actual value SOC of the charge level is lower than target value Te (ΔE>0), and the degree of correction is set at 0 when actual value SOC of the charge level is greater than target value Et (ΔE<0). That is, it is brought equivalent to the table in FIG. 3 while taking Pec as the initial value.

Also, the same correction can be realized by correcting required total output lower limit value Pts or the ratio of engine output Pe to required total output Pt or motor output Pm. That is, as target value Et for charge level SOC becomes higher, required total output lower limit value Pts for starting up the engine output should be reduced, or the ratio of engine output Pe to required total output Pt or motor output Pm should be increased.

Figure 11:
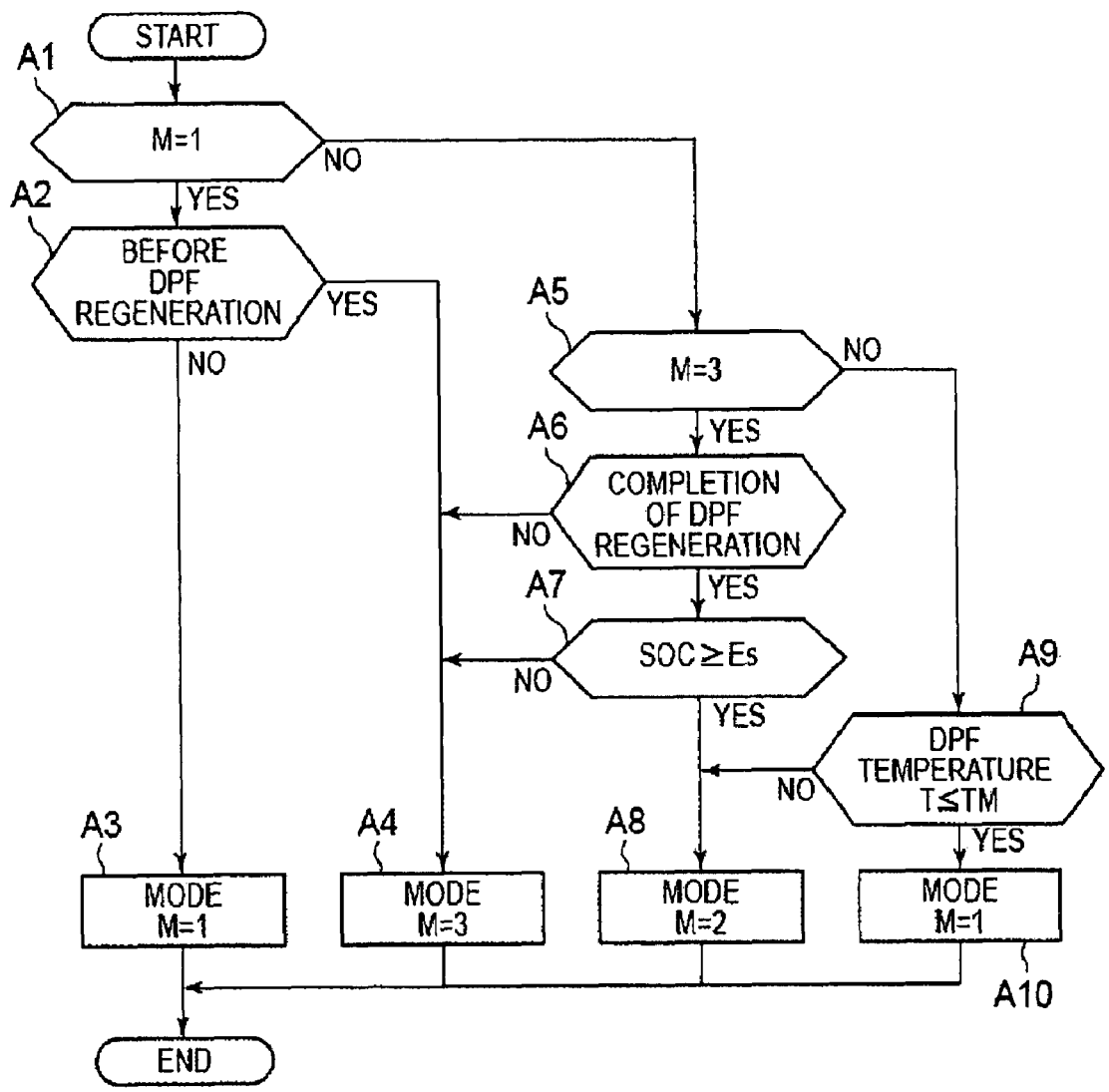
FIG. 11 is a flowchart showing a control process.

Next, the process of control will be explained using the flowchart in FIG. 11.

In A1, it is determined whether the normal mode (M=1) is selected or not.

If mode of operation is determined to be the normal mode (M=1) in A1, control advances to A2; and it is determined whether the DPF regeneration has been completed (the prescribed period prior to the beginning of the DPF regeneration during which the regeneration is already started or the regeneration has already progressed to some extent). More specifically, PM deposition count C (estimated value) of the DPF which has been computed through a different routine is read, and whether or not said count has dropped to prescribed value Cb or lower is determined.

If it is determined not to be prior to the completion of the regeneration in A2, control advances to A3, and the normal mode (M=1) is maintained.

If it is decided that regeneration is not completed in A2, control advances to A4, and there is a switch to the charge level increasing mode (M=3).

Under the charge level increasing mode (M=3), the control is carried out in such a manner that the engine output is increased for the engine to drive the motor so as to generate electric power in order to increase charge level SOC of the battery. In addition, the control is carried out at this time in such a manner that the SOC target value is increased as PM deposition count C of the DPF drops so as to further increase the SOC in order to prepare for the motor-based driving when the regeneration is completed.

Once a switch to the charge level increasing mode (M=3) is made, M=1 no longer holds during the judgment in A1, so that control advances from A1 to A5.

In A5, it is determined whether charge level increasing mode (M=3) is selected or not. If yes, control advances to A6.

In A6, it is determined whether the DPF regeneration is completed or not. More specifically, PM deposition count C (estimated value) of the DPF which has been computed through a different routine is read, and it is determined whether or not the count has dropped to the prescribed value Ce or lower. Of course Ce<Cb.

If a decision is made in A6 that the DPF regeneration is not completed, control advances to A4, and the charge level increasing mode (M=3) is maintained.

If a decision is made in A6 that the DPF regeneration is completed, control advances to A7, and it is determined whether charge level SOC of the battery has reached target value Et (in this case, target value Es which corresponds to PM deposition count Ce at the time of completion of the DPF regeneration) which has been computed through a different routine or not.

If SOC≧Es does not hold as a result of the judgment in A7, control advances to A4, and the charge level increasing mode (M=3) is maintained.

If it is decided in A7 that SOC≧Es holds, control advances to A8, and there is a switch to the motor-based driving (M=2).

Under the motor-based driving (M=2), the control is carried out in such a manner that supply of fuel to the engine is stopped, and the motor output is increased to let the motor rotate the engine at a prescribed rotation speed or faster.

Therefore, the engine rotates without any load at a faster speed than normal, and a large amount of low temperature air flows in the exhaust gas path. Thus, residual PM in the DPF can be burned quickly, and the DPF can be cooled at the same time so as to facilitate the drop in the temperature.

Once switched to the motor-based driving (M=2), control advances to A9, because M=1 no longer holds during the judgment in A1 and M=3 no longer holds during the judgment in A5.

In A9, DPF temperature T is read, and it is determined whether the temperature has become equal to a prescribed temperature Tm or lower.

If T≦Tm, control advances to A8, and motor-based driving (M=2) for DPF cooling is maintained.

When T≦Tm is realized, control advances to A10, and the motor-based driving (M=2) for cooling the DPF is ended before returning to the normal mode (M=1).

Next, control flow will be explained using the timing chart in FIG. 12.

Figure 12:
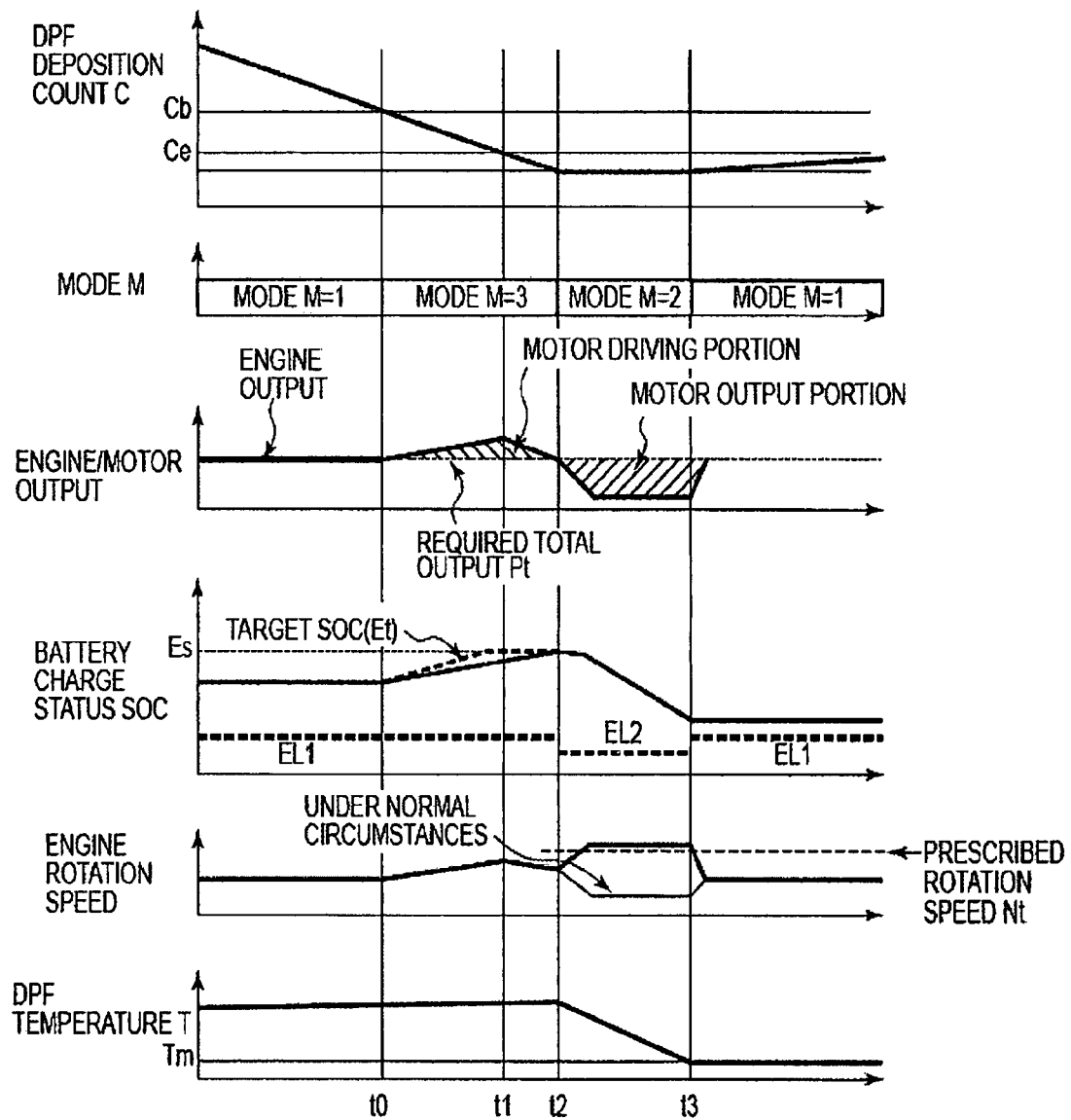
FIG. 12 is a comparison time plot showing a plurality of control process parameters as a function of time for a control process as shown in the flowchart of FIG. 11.

The timing chart in FIG. 12 shows a control condition in which, after a decision is made that PM deposition count C of the DPF has exceeded the prescribed value and it is time for regeneration, the regeneration is initiated by increasing the exhaust gas temperature by retarding the timing for injecting fuel (after PM deposition count C has begun dropping).

Once regeneration begins, the normal mode (M=1) is used for driving until the prescribed period prior to the completion of the regeneration is decided.

If PM deposition count C of the DPF becomes equal to prescribed value Cb or lower at point t0, a decision is made that regeneration has not ended, that is, it is time to start the control for completing the regeneration control, and a switch is made to the charge level increasing mode (M=3).

Under the charge level increasing mode (M=3), the control is carried out in such a manner that the engine output is increased more than under the normal mode (M=1) so as to let the engine drive the motor to generate electric power in order to increase charge level SOC of the battery. In addition, the control is carried out at this time in such a manner that SOC target value Et is increased as PM deposition count C of the DPF drops so as to increase the SOC in order to prepare for motor-based driving when regeneration is completed.

As PM deposition count C of the DPF becomes equal to prescribed value Ce or lower at point t1, a decision is made that the regeneration is completed. At this time, if battery charge level SOC has already reached target value Es, there is an immediate switch to the motor-based driving mode (M=2), but if battery charge level SOC has not yet reached target value Es, the charge level increasing mode (M=3) is maintained.

Assuming that battery charge level SOC has reached target value Es at the time of completion of the regeneration at point t2, there is a switch to the motor-based driving mode (M=2) at that point.

Under motor-based driving (M=2), the supply of fuel to the engine is stopped, and the motor output is increased more than under the normal mode (M=1) in order to increase the rotation speed of the internal combustion engine. At this time, the control is carried out so as to let the motor revolve the engine at a prescribed rotation speed Nt or faster. The prescribed rotation speed Nt is the lower limit value of the rotation speed at which the temperature of the exhaust gas purification device can be reduced. Therefore, the engine revolves without any load at a high speed, and a large amount of low temperature air flows in the exhaust gas path. Hence, residual PM in the DPF can be burned up quickly, and the DPF can be cooled at the same time so as to facilitate this drop in the temperature. Furthermore, when a lower limit (normally, EL1) is provided for battery charge level SOC, it is changed to value EL2 which is lower than normal.

When DPF temperature T becomes equal to prescribed value Tm or lower at point t3, the motor-based driving (M=2) for cooling the DPF is ended before returning to the normal mode (M=1).

According to the present embodiment, because the control is carried out so as to increase the motor output to let the motor rotate the engine at the prescribed rotation speed or faster in order to reduce the engine load to lower the exhaust gas temperature and cool the exhaust gas purification device at the time of regeneration of exhaust gas purification device (DPF) is completed, the temperature can be reduced more quickly.

In addition, according to the present embodiment, because the aforementioned control for completing the regeneration is continued until the temperature of the exhaust gas purification device (DPF) becomes equal to or lower than the prescribed temperature Tm (temperature assumed under normal conditions), variation of the temperature can be reliably prevented, so that the normal control can be resumed promptly.

In addition, according to the present embodiment, because the control for increasing battery charge level SOC is carried out in such a manner that the engine output is increased so as to let the engine drive the motor to generate electric power before the regeneration of the exhaust gas purification device (DPF) is completed, the motor becomes ready for motor-based driving when the regeneration is completed, so that reduction of the temperature of the exhaust gas purification device through motor-based driving can be assured.

In addition, according to the present embodiment, because the judgment as to whether a given time is before the regeneration of the exhaust gas purification device (DPF) or not is made based on the estimated value of the deposition count of the deposits (PM), the time it takes to complete the regeneration can be judged quantitatively, so that an appropriate timing for applying the electric power generation control can be set before the completion of the regeneration.

In addition, according to the present embodiment, because the control for increasing battery charge level SOC is carried out according to the deposition count of the deposits (PM), charging can be carried out before the completion of the regeneration in accordance with the progress of the regeneration treatment.

In addition, according to the present embodiment, because the control is carried out according to the deposition count of the deposits (PM), that is, battery charge level SOC is further increased as the deposition count drops, charge level SOC can be increased gradually to match the completion of regeneration.

In addition, according to the present embodiment, because the control for increasing battery charge level SOC is carried out based at least on the correction for increasing upper limit value Pec of the engine output, the correction for decreasing the required total output lower limit value for initiating the engine output, or the correction for increasing the ratio of the engine output to the required total output during the allocation control of the engine and the motor outputs, the allocation of the engine and the motor outputs is changed through collaborative control so as to bring the difference between the generation and the consumption of electric power by the motor toward the positive side, so that charge level SOC can be boosted reliably.

In addition, the ease of following target value Et can be improved according to the present embodiment, because the amount of the aforementioned correction is changed according to the degree of divergence ΔE (=Et−SOC) between target value Et for the charge level, which is set according to the deposition count of the deposits (PM), and actual value SOC of the charge level, and the difference between the generation and the consumption of the electric power of the motor is brought toward the positive side as the degree of divergence ΔE becomes greater.

In addition, according to the present embodiment, because the aforementioned correction is made when actual value SOC of the charge level is lower than target value Et, but is not made, when actual value SOC is greater than target value Et, the SOC may be increased at an early stage and kept high so as not to reduce the SOC forcibly. Thus, an optimally selected pattern can be used for driving, in an event in which little effect on the drivability is suspected even when the SOC is increased to the level suitable for the motor-based driving at the time of the completion of the regeneration.

Furthermore, although target value Et for charge level SOC in accordance with PM deposition count C is set as a single value as shown in FIG. 9 in the aforementioned embodiments, it may be set in the form of a target range comprising an upper limit value and a lower limit value.

Figure 13:
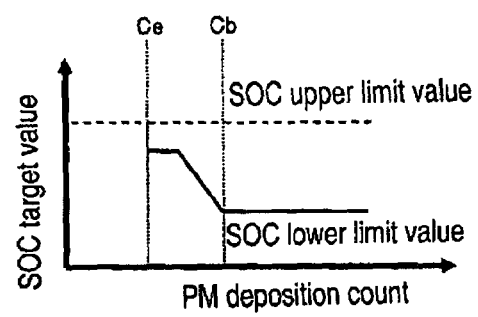
FIG. 13 is a graph of battery state of charge (SOC) target versus PM deposition count according to another example.

In such case, as shown in FIG. 13, a target value for the charge level is set in the form of a target range comprising an SOC upper limit value and an SOC lower limit value. The SOC lower limit value should be set in such a manner that it is increased as PM deposition count C decreases when PM deposition count C is equal to prescribed value Cb or lower.

Also, when the target value for the charge level is to be set in the form of a target range, the correction amount of output boundary value Pec in FIG. 10 is increased when the actual SOC falls below the SOC lower limit value of the target range, namely, when $\Delta E$ (=SOC lower limit value−actual SOC) becomes greater.

In other words, the SOC following capability is improved by bringing the difference between the generation and the consumption of the electric power of the motor further toward the positive side as the divergence for the actual SOC to follow up with the SOC lower limit value becomes greater.

Although a parallel type hybrid vehicle (FIG. 1) is explained in the aforementioned embodiments, the present invention can be applied to a series type hybrid vehicle also.

Figure 14:
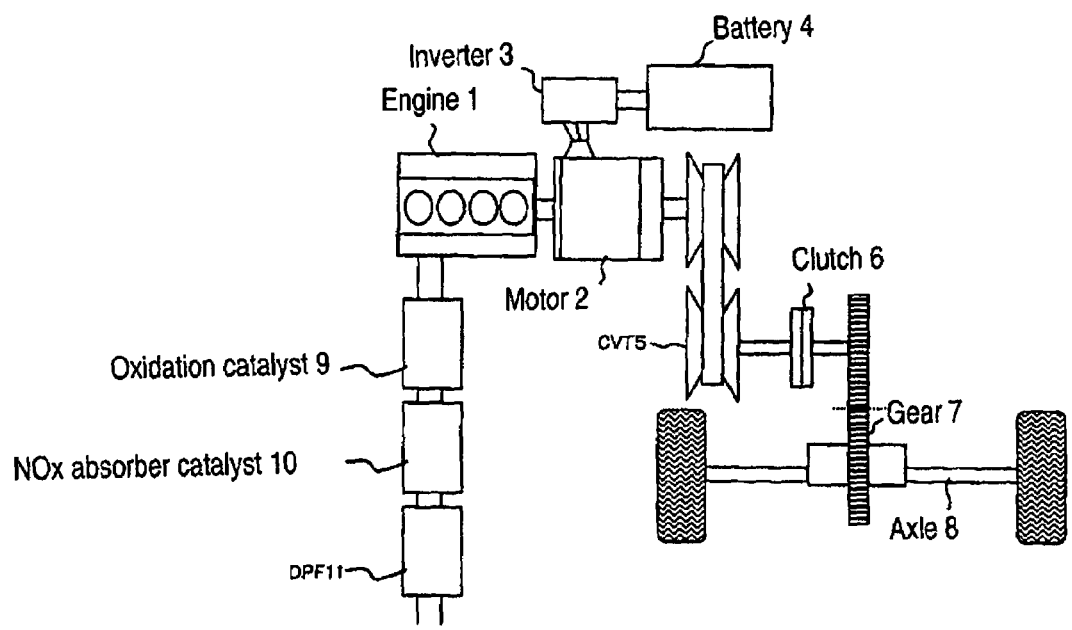
FIG. 14 is a system diagram of a series type hybrid vehicle.

FIG. 14 is a system diagram of a series type hybrid vehicle to which one or more embodiments of the present invention can be applied.

In this system, output shaft of engine 1 and output shaft of motor 2 are connected coaxially, and said single output shaft is linked to the input shaft of final reduction gear device 7 via transmission (belt-based continuously variable transmission; CVT) 5 and clutch 6.

Figure 15:
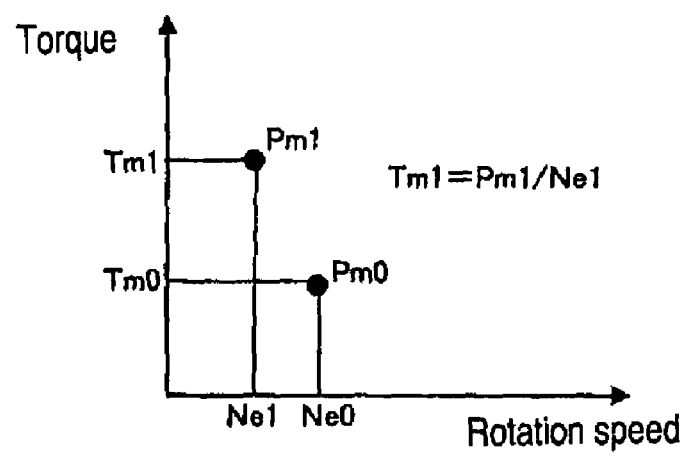
FIG. 15 a graph of torque versus rotation speed as may be derived from an electric motor operating point table that may be used with the series type hybrid vehicle.

In this case, because the rotation speeds of engine 1 and motor 2 are equal, the engine control mechanism decides the engine operating point (rotation speeds Ne0 and Ne1 and torques Te0 and Te1) from required engine outputs Pe0 and Pe1 using the engine operating point table as may be graphically depicted in FIG. 4, and the motor control mechanism uses the motor operating point table in FIG. 15 in place of the motor operating point table as may be graphically depicted in FIG. 5. Because the rotation speeds of the engine and the motor are equal, the motor torques are decided as Tm0=Pm0/Ne0 and Tm1=Pm1/Ne1 if the rotation speeds are set at Ne0 and Ne1, as shown in FIG. 15 when required motor outputs are Pm0 and Pm1.

Although a case in which the exhaust gas purification device is a DPF, and PM deposited therein is removed by burning it under a prescribed regenerative condition is explained in the aforementioned embodiments, the present invention can alternatively be applied also to a case in which the exhaust gas purification device is an NOx adsorption catalyst, and sulfur deposited therein is removed by burning it under a prescribed regenerative condition.

Figure 16:
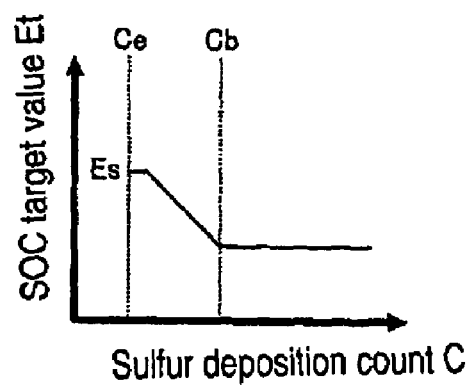
FIG. 16 is a graph of SOC target value (Et) versus sulfur deposition count (C).

In this case, needless to say, as shown in FIG. 16, target value Et for battery charge level SOC is set according to the deposition count (amount of sulfur poisoning) of sulfur deposited on the NOx adsorption catalyst.

As for the estimation of the sulfur deposition count (amount of sulfur poisoning), it is done by estimating a sulfur poisoning amount per a unit time from a given engine operation status and integrating them. Alternatively, it may be estimated from the cumulative driving distance also.

Next, another alternative embodiment of the present invention will be explained.

The hybrid vehicle system in the alternative embodiment is similar to the hybrid vehicle system of the first embodiment. As in the first embodiment, regeneration of the exhaust gas purification device (DPF 11 and NOx absorber catalyst 10) is initiated in the alternative embodiment as well, by bringing the temperature of the exhaust gas purification device higher than the combustion temperature of the deposits deposited therein by increasing the temperature of the exhaust gas temperature through the high load power generation operation by engine 1 by generating electric power for driving motor 2 using the surplus output to the required output which is generated by retarding the timing for injecting fuel to engine 1 and/or by increasing the output of engine 1.

However, in the event of an excessive temperature due to excessive burning during the regeneration of the exhaust gas purification device (DPF 11 and NOx absorber catalyst 10), the temperature must be reduced. In such a case, the only measure to restrain the temperature is to reduce the air-fuel ratio (correction to the rich side). However, the enrichment in the low-speed rotation low-load area results in unstable combustion, leading to the risk of deterioration of exhaust gas (HC) and fuel consumption.

The alternative embodiment may be configured such that when an excessive temperature has occurred during the regeneration of the exhaust gas purification device (DPF 11 and NOx absorber catalyst 10), a control process may be carried out in such a manner that (1) the air-fuel ratio of engine 1 is enriched, the output of engine 1 is increased so as to move out of the low load area, and motor 2 is driven using the surplus output so as to generate electric power, or (2) the output of motor 2 is increased so as to let motor 2 rotate the engine at a prescribed rotation speed or faster (preferably, motor-based driving, wherein supply of fuel to engine 1 is stopped, and the output is obtained using motor 2 only). Furthermore, the prescribed rotation speed as used here refers to a rotation speed (Nt in FIG. 23) at which the temperature of the exhaust gas purification device can be reduced.

When aforementioned control process (1) is carried out, the reduction in the temperature of the exhaust gas purification device can be facilitated by enrichment in the high load area while avoiding enrichment of the air-fuel ratio in the low load area of engine 1, which results in the deterioration of the exhaust gas and fuel consumption. Also, the surplus engine output can be devoted to generation of electric power so as to charge battery 4 for future use.

In addition, when aforementioned control process (2) is carried out, engine 1 is brought to the low-load (loadless) high-rotation speed status, and the temperature of the exhaust gas purification device can be reduced promptly by supplying a cooling gas (air) to the exhaust gas purification device. As a result, an excessive temperature of the exhaust gas purification device can be restrained.

More specifically, when an excessive temperature of the exhaust gas purification device is detected during the regeneration of the exhaust gas purification device, aforementioned control (1) and control (2) are switched selectively according to the charge status of battery 4.

Such control will be explained in detail below using an example of the regeneration of DPF 11.

Figure 17:
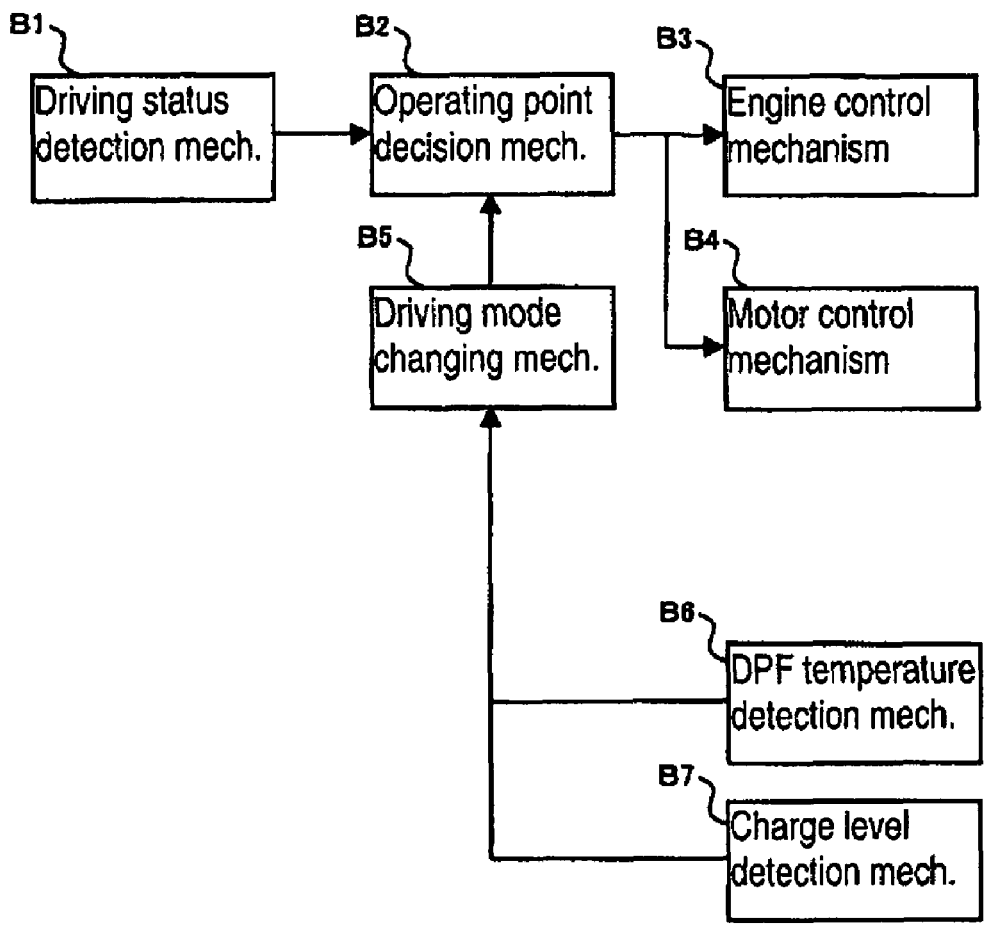
FIG. 17 is a block diagram for controlling a hybrid vehicle according to an alternative embodiment.

FIG. 17 is a control block diagram for the hybrid vehicle.

Driving status detection mechanism B1, which detects a given driving status of the vehicle, operating point decision mechanism B2, which decides the respective operating points for the engine and the motor according to said detection result, engine control mechanism B3, which controls the engine according to the engine operating point decided, and motor control mechanism B4, which controls the motor according to the motor operating point decided, are provided.

On the other hand, due to the relationship of aforementioned operating point decision mechanism B2 with the DPF regenerative control, the controller 100 may be configured so as to change the operating points according to a driving mode specified by driving mode changing mechanism B5; and information items from DPF temperature estimation mechanism B6 and charge amount detection mechanism B7 are input to driving mode changing mechanism B5.

For example, the DPF temperature detecting mechanism B6 may detect the DPF temperature using a sensor which detects the DPF holder temperature or the exhaust gas temperature on the downstream side and/or the upstream side of the DPF.

Charge amount detection mechanism B7 detects battery charge level SOC by integrating the discharge current using a current sensor that detects a current discharged from the battery, for example. Here, charge level SOC is usually obtained in the form of a ratio (%) to the fully charged level.

Next, the driving mode to be specified by driving mode changing mechanism 5 according to the DPF temperature and the battery charge level will be explained.

Since a normal mode (M=1), an engine output increasing mode (M=4), and a motor output increasing mode (M=5) are available as driving modes, they will be explained below.

Normal mode (M=1) is a mode for the normal driving including during DPF regeneration, and it is identical to the normal mode (M=1) in the first embodiment. A total output Pt required by the vehicle is computed based on driving status information from the driving status detection means; engine output Pe and motor output Pm are decided according to required total output Pt based on the hybrid output (engine/motor output) allocation table represented in FIG. 3, which shows allocation of hybrid outputs with respect to the total output, and are instructed to the engine control mechanism and the motor control means.

In the engine control means, an operating point is decided based on engine output Pe decided according to the engine operating point table in FIG. 4.

Combinations of torques Te0, Te1, . . . , and etc. and rotation speeds Ne0, Ne1, . . . , and etc. at which the fuel consumption becomes optimum with respect to the respective engine output values Pe0, Pe1, . . . , and etc. are set in the operating point table.

In the motor control means, an operating point is decided based on motor output Pm decided according to the motor operating point table in FIG. 5. Combinations of torques Tm0, Tm1,. . . , and etc. and rotation speeds Nm0, Nm1, . . . , and etc. at which the fuel consumption becomes optimum with respect to the respective motor output values Pm0, Pm1, . . . , and etc. are set in said operating point table.

Engine output increasing mode (M=4) is a driving mode to be selected when the DPF has an excess temperature, and the temperature must be reduced, yet the battery charge level is low. Thus, a driving mode is selected together with the enrichment of the air-fuel ratio of the engine so as to increase the engine output (ratio) in order to move out of the low load area (area where an increase in the temperature cannot be restrained unless the oxygen concentration is reduced more than normal while leaving the risk that the exhaust gas may deteriorate due to the reduced oxygen concentration) while using the surplus output to drive the motor to generate electric power.

Figure 18:
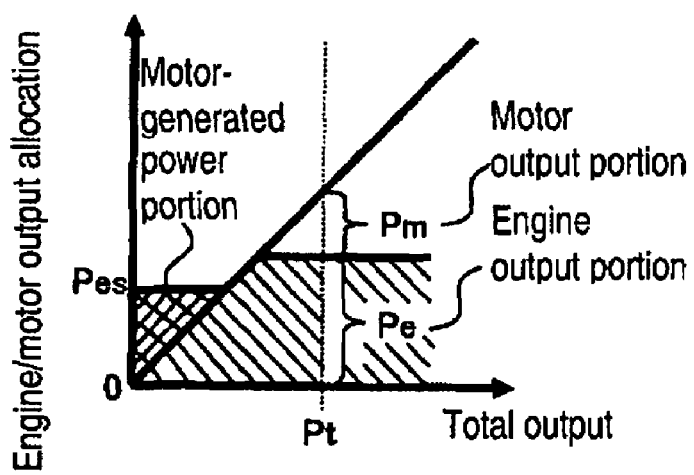
FIG. 18 is a graph of engine/motor output allocation versus total output that may be derived from an output allocation table as may be used under an engine output increasing mode (M=4).

For this purpose, engine output Pe and motor output Pm are decided from required total output Pt using the hybrid output allocation table represented in FIG. 18 and instructed to the engine control mechanism and the motor control means.

Contrary to the hybrid output allocation table in FIG. 3, in the hybrid output allocation table represented in FIG. 18, the engine output is increased (motor output is set at 0) in the low output area so as to use the surplus portion (Pes−Pt) of the engine output with respect to the required total output Pt in the low output area for the motor to generate electric power.

Figure 19:
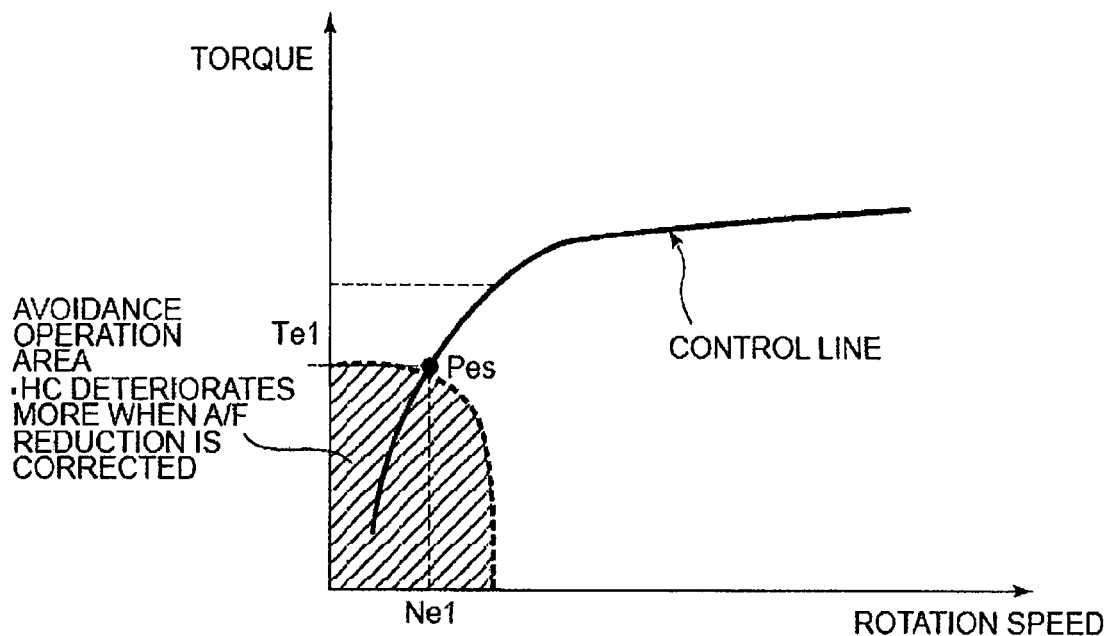
FIG. 19 is a graph of torque versus rotation speed as may be derived from an internal combustion engine operating point table as may be used under an engine output increasing mode (M=4).

Furthermore, although the engine operating point table used in the engine output increasing mode (M=4) may be the same as that represented in FIG. 4, operation in the low load area, where the HC deteriorates due to the enrichment of the air-fuel ratio, can be avoided as shown in FIG. 19 (no operation in the area indicated by the slanted lines to the left below the broken line).

Motor output increasing mode (M=5) is a driving mode to be selected when the DPF has an excess temperature, and the temperature must be reduced, yet the battery charge level is high; therein, the motor output (ratio) is increased more than under the normal mode (M=1) in order to increase the rotation speed of the internal combustion engine. The total output is obtained using the motor alone (motor output 100%) at least in the low-medium output area. Then, although the supply of fuel to the engine is stopped when obtaining the output using the motor alone, the motor is used to rotate the engine at prescribed rotation speed Nt or faster (loadless high speed rotation) while the clutch is kept engaged and the shift pattern is changed as needed, and cooling air is supplied to the DPF. Here, prescribed rotation speed Nt is the lower limit value at which the amount of air sufficient to reduce the DPF temperature can be supplied. The control is carried out in such a manner that the cooling effect of the air supersedes the heat generated by the burning of the PM in the DPF in order to reduce the temperature effectively.

Figure 20:
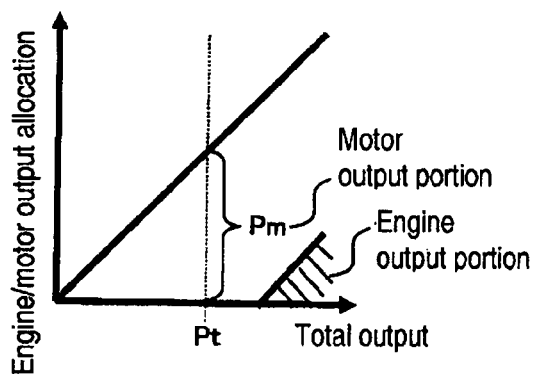
FIG. 20 is a graph of engine/motor output allocation versus total output that may be derived from an output allocation table as may be used under a motor output increasing mode (M=5).

For this purpose, engine output Pe and motor output Pm are decided from required total output Pt using the hybrid output allocation table in FIG. 20, and instructed to the engine control mechanism and the motor control means.

In the hybrid output allocation table in FIG. 20, the engine output is set at 0, and the motor output ratio is set at 100% in the low-medium output area other than the high output area.

Figure 21:
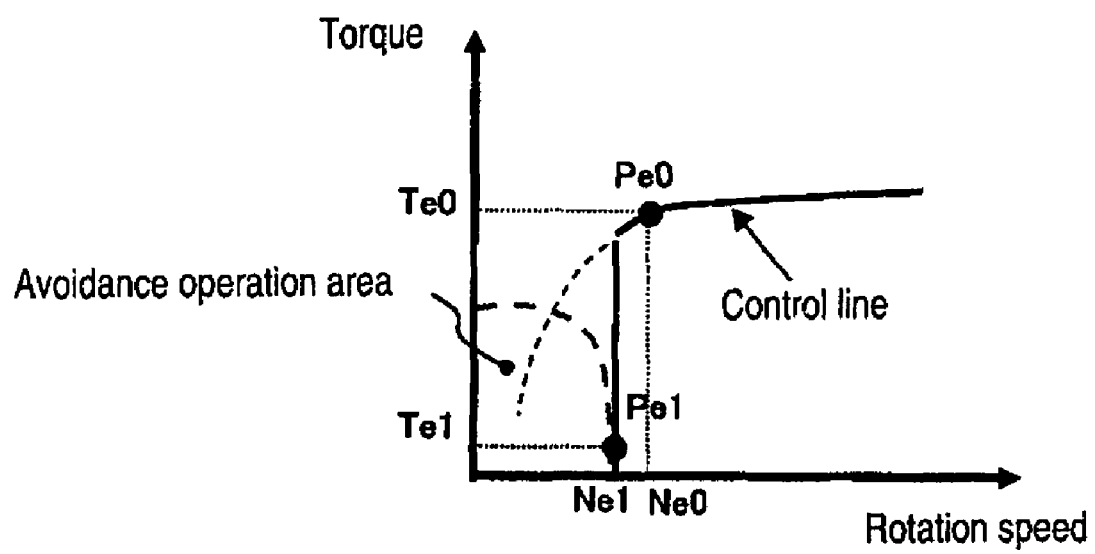
FIG. 21 is a graph of torque versus rotation speed as may be derived from an internal combustion engine operating point table as may be used under the motor output increasing mode (M=5).

Furthermore, the engine operating point table used under the motor output increasing mode (M=5) becomes like that represented in FIG. 21, wherein operation in the low-rotation area becomes absent.

Figure 22:
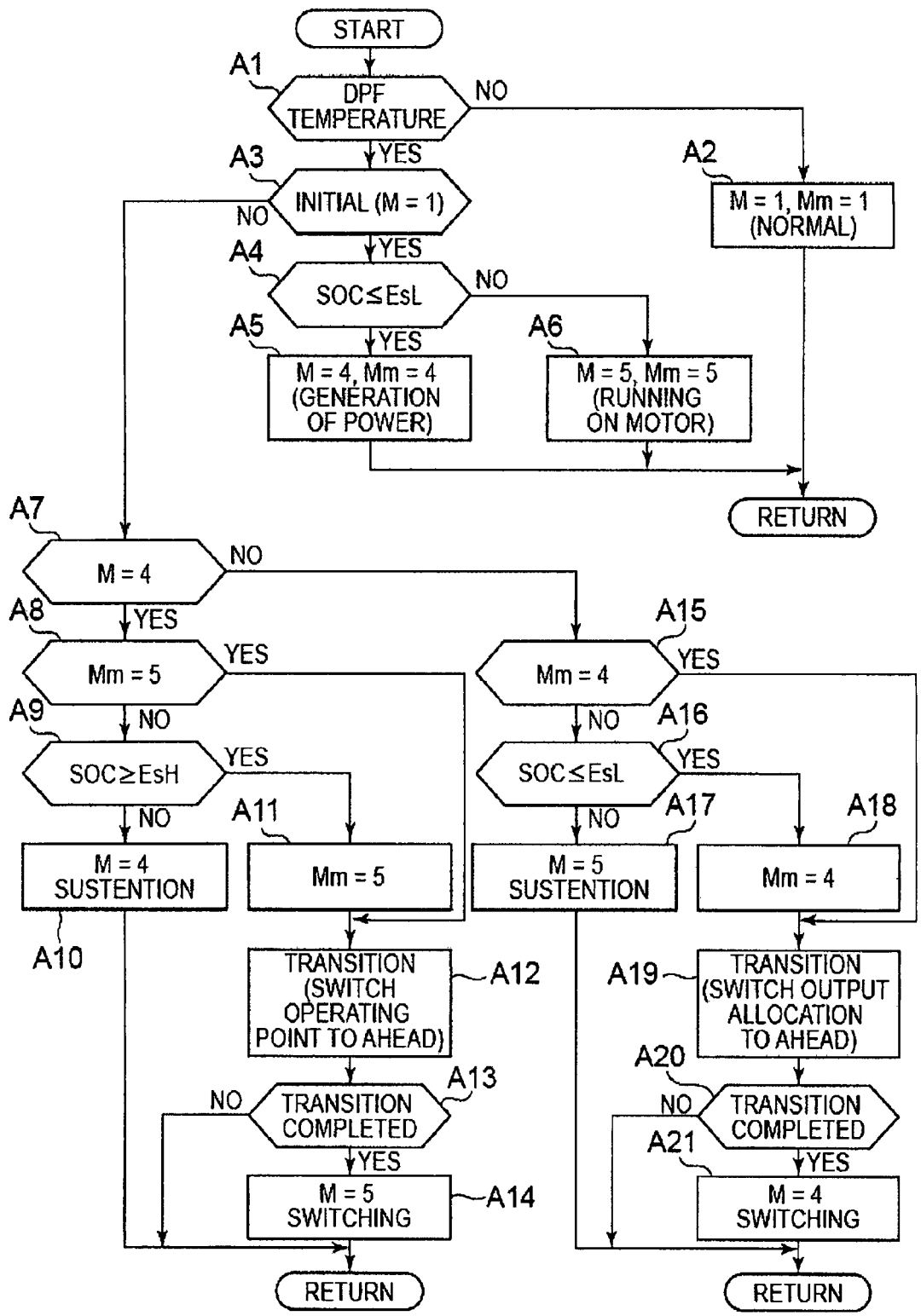
FIG. 22 is a flowchart showing a control process for an alternative embodiment.

Next, a control process will be explained using the flowchart in FIG. 22.

In A1, it is determined whether the DPF has an excessive temperature or not. For example, the period after DPF temperature T has reached prescribed value Te (for example, 750° C.), which is used to determine an excessive temperature, and until it returns to prescribed value Ts (for example, 600° C.), which is used to determine an appropriate temperature, is considered an excessive temperature status. Assume that the DPF has an excessive temperature while it is under the excessive temperature status.

If it does not have an excessive temperature, control advances to A2, the normal mode (M=1) is set, and target transition mode value Mm=1 is set.

If it has an excessive temperature, control advances to A3, and it is determined whether the excessive temperature is detected for the first time or not based on whether M=1 or not.

If it is the first time, control advances to A4, and battery charge level SOC is compared with a first level EsL on the low side in order to determine whether SOC≦EsL or not.

If SOC≦EsL holds, the control process advances to A5, and the setting is changed from the normal mode (M=1) to the engine output increasing mode (M=4), and target transition mode value Mm=4 is set at the same time.

Under the engine output increasing mode (M=4), reduction of the DPF temperature can be facilitated by enriching the air-fuel ratio of the engine and increasing the engine output so as to move out of the low load area. Also, the surplus output of the engine can be used to drive the motor to generate electric power and to charge the electric into the battery in order to prepare for motor-based driving.

If SOC>EsL, control advances to A6, the motor output increasing mode (M=5) is set, and target transition mode value Mm=5 is set at the same time.

Under the motor output increasing mode (M=5), particularly while in the low-medium output area, the supply of fuel to the engine is stopped, and the motor output is increased to prepare for motor-based driving. At this time, the motor is used to rotate the engine at a high speed, and cooling air is supplied to the DPF in order to cool the DPF.

Here, although it is quite natural to set the motor output increasing mode (M=5) when battery charge level SOC is in excess of second level EsH on the high side, if an excessive temperature is detected for the first time, the motor output increasing mode (M=5) is set even when battery charge level SOC is between first level EsL and second level EsH. The reason is that, because a greater cooling effect can be achieved using the motor output increasing mode (M=5), the temperature can be reduced more quickly.

In addition, while the presence of an excessive temperature of the DPF is being detected, the higher the DPF temperature becomes, the lower the first and second levels EsL and EsH are set. As a result, when the DPF temperature is high, the temperature can be reduced more quickly by selecting the motor output increasing mode (M=5), which offers better cooling efficiency. As the DPF temperature converges to the appropriate temperature gradually, the battery charge level SOC also approaches the appropriate value.

When the engine output increasing mode (M=4) or the motor output increasing mode (M=5) is set at the second or later time after the excessive temperature occurred, control advances from A3 to A7.

In A7, it is determined whether M=4 or not, and control advances to A8 if M=4. If not M=4 (that is, if M=5), control advances to A15.

The processing to be carried out in A8~A14 when the engine output increasing mode (M=4) is set will be explained below.

In A8, it is determined whether target transition mode value Mm=5 holds or not. If M=4, Mm=4 is set in the beginning, so control advances to A9.

In A9, it is determined whether battery charge level SOC has reached second level EsH on the high side or higher or not. That is, it is determined whether or not the battery charge level SOC has increased sufficiently by the engine output increasing mode (M=4), which is used to generate electric power.

If SOC<EsH, control advances to A10, and the engine output increasing mode (M=4) is maintained.

If SOC>EsH, control advances to A11, and target transition mode value Mm=5 is set in order to prepare for mode switching before control advances to A12. Once Mm=5 is set, control advances from A8 to A12 the next time and thereafter.

In A12, when switching from the engine output increasing mode (M=4) to the motor output increasing mode (M=5), only the engine operating point table is switched from FIG. 19 (for M=4) to FIG. 21 (for M=5), while continuing to use the hybrid output allocation table (for M=4) in FIG. 18 in order to make the transition via the high rotation speed high load area.

A13, completion of the transition is awaited while checking whether or not the transition is completed based on the time elapsed.

Upon the completion of the transition, control advances to A14, and there is a switch to the motor output increasing mode (M=5). That is, the hybrid output allocation table is switched from FIG. 18 (for M=4) to FIG. 20 (for M=5).

Next, the process to be carried out in A15~A21 when the motor output increasing mode (M=5) is set will be explained.

In A15, it is determined whether or not the target transition mode value Mm=4 holds. If M=5, Mm=5 is set in the beginning, so that the control advances to A16.

In A16, it is determined whether or not the battery charge level SOC has reached first level EsL on the low side. That is, it is determined whether or not the battery charge level SOC has dropped to first level EsL as it is consumed in the motor output increasing mode (M=5).

If SOC>EsL, control advances to A17, and the motor output increasing mode (M=5) is maintained.

If SOC≦EsL, control advances to A18, and target transition mode value Mm=4 is set in order to prepare for mode switching before advancing to A19. Once Mm=4 is set, control advances from A15 to A19 the next time and thereafter.

In A19, when switching from the motor output increasing mode (M=5) to the engine output increasing mode (M=4), only the hybrid output allocation table is switched from FIG. 20 (for M=5) to FIG. 18 (for M=4), while continuing to use the engine operating point table (for M=5) in FIG. 21 in order to make the transition via the high rotation speed high load area.

Because FIG. 18 (for M=4) as the hybrid output allocation table and FIG. 21 (for M=5) as the engine operating point table are used in combination in A12 or A19 regardless of the direction of the transition during the switching between the engine output increasing mode (M=4) and the motor output increasing mode (M=5), the transition is made via the high rotation speed high load area. As a result, during the switching between the aforementioned control for increasing the output of the engine and the aforementioned control for increasing the output of the motor, the transition is made via the high rotation speed high load area of the engine, so that the control can be switched while reliably avoiding the area where HC deterioration occurs due to the dissipation of the DPF temperature and the enrichment of the air-fuel ratio.

In A20, completion of the transition is awaited, while checking whether the transition is completed or not based on the time elapsed.

Upon the completion of the transition, control advances to A21, and there is a switch to the engine output increasing mode (M=4). That is, the engine operating point table is switched from FIG. 21 (for M=5) to FIG. 19 (for M=4).

Next, a control process will be explained using the timing chart in FIG. 23.

The timing chart in FIG. 23 shows a control condition in which after a decision is made that it is time for regenerating the DPF, and the regeneration is initiated by increasing the exhaust gas temperature by retarding the timing for injecting fuel; for example, DPF temperature T has increased excessively for some reason and reached prescribed value Te (for example, 750° C.), which is used to determine an excessive temperature, at point t0.

Even during the regeneration, the normal mode (M=1) is used for driving until an excessive temperature is detected (before t0).

When an excessive temperature is detected at t0 as DPF temperature T≧Te occurs, the motor output increasing mode (M=5) is set in order to prioritize the DPF cooling if battery charge level SOC is between first level EsL on the low side and second level EsH on the high side.

Under the motor output increasing mode (M=5), particularly while in the low-medium output area, the supply of fuel to the engine is stopped, and the motor output is increased to prepare for motor-based driving. At this time, the motor is used to rotate the engine at a high speed, and cooling air is supplied to the DPF in order to cool the DPF. The engine is rotated at a rotation speed equal to or faster than the prescribed rotation speed Nt, which is the lower limit value of the rotation speed at which sufficient air for reducing the temperature of the DPF can be supplied. However, because battery power is consumed, the battery charge level SOC drops gradually.

As battery charge level SOC drops due to the use of the motor output increasing mode (M=5) and falls below first level EsL at point t2, switching to the engine output increasing mode (M=4) is initiated.

At this time, there is a switch to target transition mode value Mm=4 at point t2, while the motor output increasing mode (M=5) is maintained, and the transition is made via the high speed rotation high load area.

After passing through t2, t3, and t4, the transition is completed at t5 to switch to the engine output increasing mode (M=4).

Under the engine output increasing mode (M=4), the air-fuel ratio of the engine is enriched, and the engine output is increased so as to move out of the low load area in order to facilitate the reduction of the DPF temperature. In addition, the surplus output of the engine is used to drive the motor to generate electric power and charge it into the battery in order to prepare for the motor-based driving.

When battery charge level SOC is increased by the engine output increasing mode (M=4) and exceeds second level EsH at point t6, switching to the motor output increasing mode (M=5) is initiated.

At this time, switching to target transition mode value Mm=5 is made at point t6 while the engine output increasing mode (M=4) is maintained, and the transition is made via the high speed rotation high load area.

Then, after passing through t6, t7, and t8, the transition is completed at t9 to switch to the motor output increasing mode (M=5).

Subsequently, as DPF temperature T drops to prescribed value Ts (for example, 600° C.), which is used to determine an appropriate temperature, it is assumed at point t10 to have left the excessive temperature status, and the normal mode (M=1) is resumed from that point.

According to the present embodiment, because the mechanism for determining the temperature condition of the exhaust gas purification device (DPF) is provided, and the control is carried out in such a manner that, when an excessive temperature of the exhaust gas purification device (DPF) is detected during the regeneration of the exhaust gas purification device (DPF), the air-fuel ratio of the engine is enriched so as to increase the output of the engine in order to leave the low load area while using the surplus output to drive the motor to generate electric power, reduction of the temperature of the exhaust gas purification device (DPF) can be facilitated through the enrichment in the high load area while avoiding the enrichment of the air-fuel ratio in the low load area of the engine, which would result in deterioration of the exhaust gas and the fuel consumption, and the surplus output is utilized to generate electric power to be charged into the battery for later used, so that the fuel consumption can also be improved.

In addition, according to the present embodiment, the temperature of the exhaust gas purification device (DPF) can be reduced promptly because the mechanism for determining the temperature condition of the exhaust gas purification device (DPF) is provided, and the control is carried out in such a manner that, when an excessive temperature of the exhaust gas purification device (DPF) is detected during the regeneration of the exhaust gas purification device (DPF), the output of the motor is increased so as to let the motor rotate the engine at a prescribed rotation speed or faster while bringing the engine to a low load (loadless) high speed rotation status, and a sufficient amount of cooling gas (air) is supplied to the exhaust gas purification device (DPF).

In addition, according to the present embodiment, the optimum control can be selected because the mechanism for determining the temperature condition of the exhaust gas purification device (DPF) and the mechanism for determining the battery charge condition during regeneration of exhaust gas purification device (DPF) are provided, and the control for increasing the output of the engine and the control for increasing the output of the aforementioned motor are switched according to the battery charge condition when an excessive temperature of exhaust gas purification device (DPF) is detected.

In addition, according to the present embodiment, when switching between the control for increasing the output of the engine and the control for increasing the output of the aforementioned motor, the transition is made via the high rotation speed high load area of the engine, so that the control can be switched while avoiding the area where the HC deteriorates due to the variation of the DPF temperature and the enrichment of the air-fuel ratio.

In addition, according to the present embodiment, because first level EsL on the low side and second level EsH on the high side are provided as battery charge levels, and the aforementioned control for increasing the output of the engine is continued after the battery charge level has dropped below aforementioned first level EsL and until it increases to aforementioned second level EsH, an excessive temperature of the DPF can be restrained while keeping the difference between the generation and the consumption of electric power by the motor on the positive side so as to prevent excessive discharge when there is not much extra room in the battery charge level.

In addition, according to the present embodiment, because first level EsL on the low side and second level EsH on the high side are provided as battery charge levels, and the aforementioned control for increasing the output of the motor is continued after the battery charge level has increased above aforementioned second level EsH and until it drops to aforementioned first level EsL, an excessive temperature of the DPF can be restrained reliably through forced cooling by mechanism of the slave-rotation of the engine by bringing the difference between the generation and the consumption of the electric power of the motor to the negative status when there is enough extra room in the battery charge level.

In addition, according to the present embodiment, because the aforementioned control for increasing the output of the motor is carried out in priority to the aforementioned control for increasing the output of the engine when the battery charge level is between aforementioned first level EsL and aforementioned second level EsH during the first detection of an excessive temperature of the exhaust gas purification device (DPF), the temperature of the exhaust gas purification device (DPF) can be reduced at an early stage by prioritizing the control which offers better cooling efficiency.

In addition, according to the present embodiment, because aforementioned first and second levels EsL and EsH are set lower as the temperature of the exhaust gas purification device (DPF) rises when an excessive temperature of the exhaust gas purification device (DPF) is detected, the opportunity for the control which offers better cooling efficiency can be increased, so that the temperature of the exhaust gas purification device (DPF) can be reduced at an early stage.

Although a parallel type hybrid vehicle (FIG. 1) is explained in an alternative embodiment, the present invention can also be applied to a series type hybrid vehicle.

FIG. 14 is a system diagram of a series type hybrid vehicle to which the present invention can be applied.

In this system, output shaft of engine 1 and output shaft of motor 2 are connected coaxially, and said single output shaft is linked to the input shaft of final reduction gear device 7 via transmission (belt-based continuously variable transmission; CVT) 5 and clutch 6.

The present invention can be applied to this type of hybrid vehicle also. However, in this case, because the rotation speeds of engine 1 and motor 2 are the same, the engine control mechanism decides the engine operating point (rotation speeds Ne0 and Ne1 and torques Te0 and Te1) from required engine outputs Pe0 and Pe1 using the engine operating point table represented in FIG. 4, and the motor control mechanism uses the motor operating point table represented in FIG. 15 in place of the motor operating point table represented in FIG. 5. Because the rotation speeds of the engine and the motor are the same, if the rotation speeds are set at Ne0 and Ne1, the motor torques are decided as Tm0=Pm0/Ne0 and Tm1=Pm1/Ne1 as shown in FIG. 15 when required motor outputs are Pm0 and Pm1.

Although a case in which the exhaust gas purification is a DPF, and PM deposited therein are removed by burning then under a prescribed regenerative condition, is explained above in one or more embodiments, the present invention can be applied also to a case in which the exhaust gas purification is an NOx adsorption catalyst, and sulfur deposited therein is removed by burning it under a prescribed regenerative condition.

Furthermore, under the motor output increasing mode (M=5), if the engine cannot be slave-rotated at a high rotation speed due to a given system configuration or a driving condition, the rotation of the engine may be stopped so as to shut off the supply of oxygen to the exhaust gas purification device, and motor-based driving may be carried out under said condition. Alternatively, the supply of oxygen to the exhaust gas purification device may be shut off by fully opening the throttle valve or the EGR valve, and motor-based driving may be carried out under that condition.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An exhaust gas purification system for a hybrid vehicle comprising:
    an internal combustion engine and an electric motor each arranged for providing power output for the vehicle,
    an exhaust gas purification device disposed in an exhaust passage of the engine to treat exhaust gas components contained in exhaust gas from the engine,
    a controller arranged and configured to selectively perform a regeneration operation of the exhaust gas purification device to burn and remove deposits accumulated in the exhaust gas purification device, and
    the controller further arranged and configured to control the engine and the electric motor such that the exhaust gas purification device is restrained from reaching an excessive temperature during the regeneration operation of the exhaust gas purification device,
    a section to determine the excessive temperature of the exhaust gas purification device, and
    wherein when the excessive temperature of the exhaust gas purification device is detected during the regeneration operation, the engine is controlled to increase the power output with a rich air-fuel ratio operation and an excess power output caused by the increase in the power output of the engine is used to generate electric power by the electric motor.

2. The exhaust gas purification system of claim 1, wherein when the excessive temperature of the exhaust gas purification device is detected during the regeneration operation, the power output of the electric motor is increased so as to increase a rotational speed of the engine.

3. The exhaust gas purification system of claim 2, wherein the rotational speed of the engine is increased to be greater than or equal to a predetermined rotational speed when the excessive temperature of the exhaust gas purification device is detected during the regeneration operation.

4. The exhaust gas purification system of claim 2, wherein the power output of the engine is decreased when the excessive temperature of the exhaust gas purification device is detected during the regeneration operation.

5. The exhaust gas purification system of claim 1 further comprising:
    a battery connected to the electric motor, and
    a detecting section to determine a state of charge of the battery, and
    wherein, when the excessive temperature of the exhaust gas purification device is detected during the regeneration operation, a selection is made according to the state of charge as to whether the engine is controlled to increase the power output of the engine with a rich air-fuel ratio operation and the excess power output caused by the increase in power output of the engine is used to generate electric power by the electric motor, or the power output of the electric motor is increased so as to increase the rotational speed of the engine.

6. The exhaust gas purification system of claim 5, wherein when switching between the control for increasing the power output of the engine and the control for increasing the power output of the electric motor, the engine is operated with a transition via a high speed rotation and high load range of the engine.

7. The exhaust gas purification system under 5, wherein the control for increasing the power output of the engine is carried out after the state of charge of the battery has dropped below a first level and until the state of charge of the battery increases to a second level that is set higher than the first level.

8. The exhaust gas purification system of claim 7, wherein when the state of charge of the battery is between the first level and the second level when the excessive temperature of the exhaust gas purification device is first determined, the control for increasing the power output of the electric motor is carried out in priority to the control for increasing the power output of the engine.

9. The exhaust gas purification system of claim 7, wherein the first and the second levels are set lower as a temperature of the exhaust gas purification device becomes higher.

10. The exhaust gas purification system of claim 5, wherein the control for increasing the power output of the electric motor is carried out after the state of charge of the battery has increased higher than a second level and until the state of charge of the battery drops to a first level that is set lower than the second level.

11. The exhaust gas purification system of claim 10, wherein
when the state of charge of the battery is between the first level and the second level when the excessive temperature of the exhaust gas purification device is first determined, the control for increasing the power output of the electric motor is carried out in priority to the control for increasing the power output of the engine.

12. The exhaust gas purification system of claim 10, wherein
the first and the second levels are set lower as a temperature of the exhaust gas purification device becomes higher.

13. An exhaust gas purification system for a hybrid vehicle comprising:
an internal combustion engine and an electric motor each arranged for providing power output for the vehicle,
an exhaust gas purification device disposed in an exhaust passage of the engine to treat exhaust gas components contained in exhaust gas from the engine,
a controller arranged and configured to selectively perform a regeneration operation of the exhaust gas purification device to burn and remove deposits accumulated in the exhaust gas purification device,
the controller further arranged and configured to control the engine and the electric motor such that the exhaust gas purification device is restrained from reaching an excessive temperature during the regeneration operation of the exhaust gas purification device,
a battery arranged and configured to be selectively charged with electric power generated by the electric motor that is capable of being driven by the engine,
wherein a rotational speed of the engine is increased by an increase in the power output of the electric motor to prevent the exhaust gas purification device from reaching the excessive temperature, when the regeneration operation of the exhaust gas purification device is completed, and
wherein the controller is further arranged and configured to control the engine by an increase in the power output of the engine to increase a state of charge of the battery before the increase in the power output of the electric motor to prevent the exhaust purification device from reaching the excessive temperature,
wherein the controller stops a supply of fuel to the engine when the rotational speed of the engine is increased by the increase in the power output of the electric motor.

14. The exhaust gas purification system of claim 13, wherein
the rotational speed of the engine is controlled to be greater than or equal to a predetermined rotational speed when the increase in the power output of the electric motor to prevent the exhaust purification device from reaching the excessive temperature is performed.

15. The exhaust gas purification system of claim 14, wherein
the power output of the engine is reduced when the increase in the power output of the electric motor to prevent the exhaust purification device from reaching the excessive temperature is performed.

16. The exhaust gas purification system of claim 15, wherein
the increase in the power output of the electric motor to prevent the exhaust purification device from reaching the excessive temperature is continued until a temperature of the exhaust gas purification device drops to a predetermined temperature.

17. The exhaust gas purification system of claim 13, wherein
the vehicle driving is changed to a motor-based driving where only the motor provides power output to the vehicle when the regeneration operation of the exhaust gas purification device is complete.

18. An exhaust gas purification system for a hybrid vehicle comprising:
an internal combustion engine and an electric motor each arranged for providing power output for the vehicle,
an exhaust gas purification device disposed in an exhaust passage of the engine to treat exhaust gas components contained in exhaust gas from the engine,
a controller arranged and configured to selectively perform a regeneration operation of the exhaust gas purification device to burn and remove deposits accumulated in the exhaust gas purification device,
the controller further arranged and configured to control the engine and the electric motor such that the exhaust gas purification device is restrained from reaching an excessive temperature during the regeneration operation of the exhaust gas purification device,
a battery arranged and configured to be selectively charged with electric power generated by the electric motor that is capable of being driven by the engine,
wherein a rotational speed of the engine is increased by an increase in the power output of the electric motor to prevent the exhaust gas purification device from reaching the excessive temperature, when the regeneration operation of the exhaust gas purification device is completed,
wherein the controller is further arranged and configured to control the engine by an increase in the power output of the engine to increase a state of charge of the battery before the increase in the power output of the electric motor to prevent the exhaust purification device from reaching the excessive temperature,
wherein the state of charge of the battery is controlled to a target charge value that is determined based upon an amount of the deposits accumulated in the exhaust gas purification device.

19. The exhaust gas purification system of claim 18, wherein
a time to start the increase in the power output of the electric motor to prevent the exhaust purification device from reaching the excessive temperature is determined based upon an amount of the deposits accumulated in the exhaust gas purification device.

20. The exhaust gas purification system of claim 18, wherein
the target charge value becomes larger as the amount of the deposits decreases.

21. The exhaust gas purification system of claim 18, wherein
the control to increase the state of charge of the battery is performed with a compensation related to a distribution of the power output of the engine with respect to a requested total power output for the vehicle, the compensation being adapted to either increase an upper limit value of power output of the engine, decrease the requested total power output where the engine starts power output with respect to the requested total power output, or increase the power output of the engine with respect to either the requested total power output or the power output of the electric motor.

22. The exhaust gas purification system of claim 21, wherein
a compensation amount of the compensation is determined according to a deviation amount between the target charge value and an actual charge value.

23. The exhaust gas purification system of claim 22, wherein
the compensation is performed when the actual charge value is lower than the target charge value, but is prohibited to perform when the actual charge value is higher than the target charge value.

* * * * *